(12) United States Patent
Catreux et al.

(10) Patent No.: US 7,539,274 B2
(45) Date of Patent: May 26, 2009

(54) WEIGHT GENERATION METHOD FOR MULTI-ANTENNA COMMUNICATION SYSTEMS UTILIZING RF-BASED AND BASEBAND SIGNAL WEIGHTING AND COMBINING

(75) Inventors: Severine Catreux, Cardiff, CA (US); Vinko Erceg, Cardiff, CA (US); Pieter Roux, San Diego, CA (US); Pieter Van Rooyen, San Diego, CA (US); Jack Winters, Middletown, NJ (US)

(73) Assignee: Broadcom Corporation, Irvine, CA (US)

( * ) Notice: Subject to any disclaimer, the term of this patent is extended or adjusted under 35 U.S.C. 154(b) by 677 days.

(21) Appl. No.: 10/835,255

(22) Filed: Apr. 29, 2004

(65) Prior Publication Data

US 2005/0074080 A1    Apr. 7, 2005

Related U.S. Application Data

(60) Provisional application No. 60/467,295, filed on May 1, 2003.

(51) Int. Cl.
*H04B 7/10* (2006.01)

(52) U.S. Cl. .................................. 375/347; 375/349
(58) Field of Classification Search ................. 375/216, 375/346–348, 285, 349, 350
See application file for complete search history.

(56) References Cited

U.S. PATENT DOCUMENTS

| | | | |
|---|---|---|---|
| 5,345,599 A | 9/1994 | Paulraj et al. | |
| 5,625,880 A | 4/1997 | Goldberg et al. | |
| 5,642,353 A | 6/1997 | Roy, III et al. | |
| 5,949,833 A * | 9/1999 | Weerackody | 375/347 |
| 5,991,273 A | 11/1999 | Abu-Dayya | |
| 6,115,409 A * | 9/2000 | Upadhyay et al. | 375/144 |
| 6,144,711 A * | 11/2000 | Raleigh et al. | 375/347 |
| 6,240,098 B1 | 5/2001 | Thibault et al. | |
| 6,400,318 B1 * | 6/2002 | Kasami et al. | 342/383 |
| 6,628,969 B1 * | 9/2003 | Rilling | 455/561 |
| 6,804,216 B1 * | 10/2004 | Kuwahara et al. | 370/335 |
| 6,882,678 B2 * | 4/2005 | Kong et al. | 375/144 |
| 6,968,022 B1 * | 11/2005 | Poor et al. | 375/346 |
| 7,230,931 B2 * | 6/2007 | Struhsaker | 370/280 |
| 2003/0231547 A1 * | 12/2003 | Yang | 367/11 |
| 2005/0032497 A1 * | 2/2005 | Girardeau et al. | 455/272 |
| 2006/0104197 A1 * | 5/2006 | Proctor et al. | 370/209 |
| 2006/0135101 A1 * | 6/2006 | Binshtok et al. | 455/232.1 |

* cited by examiner

*Primary Examiner*—Emmanuel Bayard
(74) *Attorney, Agent, or Firm*—McAndrews, Held & Malloy, Ltd.

(57) ABSTRACT

A signal weighting and combining method implemented within a receiver having a plurality of receive antennas is disclosed herein. Each receive antenna is disposed to produce a received RF signal in response to a transmitted RF signal received through a channel. The method includes weighting the plurality of received RF signals produced by the antennas in accordance with a corresponding plurality of RF weighting values selected to maximize an output signal-to-noise ratio of the receiver averaged over the channel, thereby forming a plurality of weighted RF signals. The method further includes combining ones of the plurality of weighted RF signals in order to form one or more combined RF signals. A similar splitting and weighting method capable of being implemented within a transmitter having a plurality of transmit antennas is also disclosed.

76 Claims, 11 Drawing Sheets

WEIGHT GENERATION METHOD FOR MULTI-ANTENNA COMMUNICATION SYSTEMS UTILIZING RF-BASED AND BASEBAND SIGNAL WEIGHTING AND COMBINING

CROSS-REFERENCE TO RELATED APPLICATIONS

This application claims priority under 35 U.S.C. §119(e) to U.S. provisional application Ser. No. 60/467,295, entitled WEIGHT GENERATION METHOD FOR RF SIGNAL COMBINING IN MULTI-ANTENNA COMMUNICATION SYSTEMS, filed May 1, 2003, which is herein incorporated by reference in its entirety. This application is also related to copending U.S. non-provisional application Ser. No. 10/801,930, entitled MULTI-ANTENNA COMMUNICATION SYSTEMS UTILIZING RF-BASED AND BASEBAND SIGNAL WEIGHTING AND COMBINING, filed Mar. 16, 2004.

FIELD OF THE INVENTION

The present invention relates to communication systems utilizing transmitters and receivers having multiple antenna elements. More particularly, the present invention relates to a weight generation method for facilitating RF-based signal weighting and combining, either exclusively or in combination with baseband signal weighting and combining, in connection with transmission and reception of signals using multi-antenna transmitters and receivers.

BACKGROUND OF THE INVENTION

Most current wireless communication systems are composed of nodes configured with a single transmit and receive antenna. However, for a wide range of wireless communication systems, it has been predicted that the performance, including capacity, may be substantially improved through the use of multiple transmit and/or multiple receive antennas. Such configurations form the basis of many so-called "smart" antenna techniques. Such techniques, coupled with space-time signal processing, can be utilized both to combat the deleterious effects of multipath fading of a desired incoming signal and to suppress interfering signals. In this way both the performance and capacity of digital wireless systems in existence or being deployed (e.g., CDMA-based systems, TDMA-based systems, WLAN systems, and OFDM-based systems such as IEEE 802.11 a/g) may be improved.

The impairments to the performance of wireless systems of the type described above may be at least partially ameliorated by using multi-element antenna systems designed to introduce a diversity gain and suppress interference within the signal reception process. This has been described, for example, in "The Impact of Antenna Diversity On the Capacity of Wireless Communication Systems", by J. H. Winters et al, IEEE Transactions on Communications, vol. 42, No. 2/3/4, pages 1740-1751, February 1994. Such diversity gains improve system performance by mitigating multipath for more uniform coverage, increasing received signal-to-noise ratio (SNR) for greater range or reduced required transmit power, and providing more robustness against interference or permitting greater frequency reuse for higher capacity.

Within communication systems incorporating multi-antenna receivers, it is known that a set of M receive antennas are capable of nulling up to M-1 interferers. Accordingly, N signals may be simultaneously transmitted in the same bandwidth using N transmit antennas, with the transmitted signal then being separated into N respective signals by way of a set of N antennas deployed at the receiver. Systems of this type are generally referred to as multiple-input-multiple-output (MIMO) systems, and have been studied extensively. See, for example, "Optimum combining for indoor radio systems with multiple users," by J. H. Winters, IEEE Transactions on Communications, Vol. COM-35, No. 11, November 1987; "Capacity of Multi-Antenna Array Systems In Indoor Wireless Environment" by C. Chuah et al, Proceedings of Globecom '98 Sydney, Australia, IEEE 1998, pages 1894-1899 November 1998; and "Fading Correlation and Its Effect on the Capacity of Multi-Element Antenna Systems" by D. Shiu et al, IEEE Transactions on Communications vol. 48, No. 3, pages 502-513 March 2000.

One aspect of the attractiveness of multi-element antenna arrangements, particularly MIMOs, resides in the significant system capacity enhancements that can be achieved using these configurations. Under the assumption of perfect estimates of the applicable channel at the receiver, in a MIMO system with N transmit and N receive antenna elements, the received signal decomposes to N "spatially-multiplexed" independent channels. This results in an N-fold capacity increase relative to single-antenna systems. For a fixed overall transmitted power, the capacity offered by MIMOs scales linearly with the number of antenna elements. Specifically, it has been shown that with N transmit and N receive antennas an N-fold increase in the data rate over a single antenna system can be achieved without any increase in the total bandwidth or total transmit power. See, e.g., "On Limits of Wireless Communications in a Fading Environment When Using Multiple Antennas", by G. J. Foschini et al, Wireless Personal Communications, Kluwer Academic Publishers, vol. 6, No. 3, pages 311-335, March 1998. In experimental MIMO systems predicated upon N-fold spatial multiplexing, more than N antennas are often deployed at a given transmitter or receiver. This is because each additional antenna adds to the diversity gain and antenna gain and interference suppression applicable to all N spatially-multiplexed signals. See, e.g., "Simplified processing for high spectral efficiency wireless communication employing multi-element arrays", by G. J. Foschini, et al, IEEE Journal on Selected Areas in Communications, Volume: 17 Issue: 11, November 1999, pages 1841-1852.

Although increasing the number of transmit and/or receive antennas enhances various aspects of the performance of MIMO systems, the necessity of providing a separate RF chain for each transmit and receive antenna increases costs. Each RF chain is generally comprised a low noise amplifier, filter, downconverter, and analog to digital to converter (A/D), with the latter three devices typically being responsible for most of the cost of the RF chain. In certain existing single-antenna wireless receivers, the single required RF chain may account for in excess of 30% of the receiver's total cost. It is thus apparent that as the number of transmit and receive antennas increases, overall system cost and power consumption may unfortunately dramatically increase. It would therefore be desirable to provide a technique for utilizing relatively larger numbers of transmit/receive antennas without proportionately increasing system costs and power consumption.

The above-referenced copending non-provisional application provides such a technique by describing a wireless communication system in which it is possible to use a smaller number of RF chains within a transmitter and/or receiver than the number of transmit/receiver antennas utilized. In the case of an exemplary receiver implementation, the signal provided by each of M (M>N) antennas is passed through a low noise amplifier and then split, weighted and combined in the RF domain with the signals from the other antennas of the receiver. This forms N RF output signals, which are then passed through N RF chains. The output signals produced by an A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost. A similar technique can be used within exemplary transmitter implementations incorporating N RF chains and more than N transmit antennas.

SUMMARY OF THE INVENTION

The present invention is directed to a system and method for generating weight values for weighting elements included within the signal weighting and combining arrangements used in various multi-antenna transmitter and receiver structures. Specifically, the present invention may be applied to RF-based weighting and combining arrangements within such multi-antenna transmitter and receiver structures. The present invention may also find application when both RF-based and baseband weighting and combining arrangements are incorporated within the same multi-antenna transmitter or receiver structure.

In one aspect the present invention relates to a signal weighting and combining method implemented within a receiver having a plurality of receive antennas. Each receive antenna is disposed to produce a received RF signal in response to a transmitted RF signal received through a channel. The method includes weighting the plurality of received RF signals produced by the antennas in accordance with a corresponding plurality of RF weighting values selected to maximize an output signal-to-noise ratio of the receiver averaged over the channel, thereby forming a plurality of weighted RF signals. The method further includes combining ones of the plurality of weighted RF signals in order to form one or more combined RF signals.

The present invention also pertains to an RF splitting and weighting method implemented within a multi-antenna transmitter disposed to transmit an RF input signal through a plurality of transmit antennas so as to produce a corresponding plurality of RF output signals. Each of the RF output signals are received by a receiver after propagating through a channel. The method includes dividing the RF input signal in order to form a plurality of divided RF signals. The plurality of divided RF signals are then weighted in accordance with a corresponding plurality of RF weighting values selected to maximize an output signal-to-noise ratio of the receiver averaged over the channel, thereby forming the plurality of RF output signals.

In another aspect the present invention relates to an RF processing method implemented within a communication system including a transmitter and a receiver. The transmitter is configured with a set of transmit antennas disposed to transmit a set of spatially-multiplexed RF output signals through a channel. The receiver includes a plurality of receive antennas disposed to generate a corresponding first plurality of spatially-multiplexed received RF signals in response to receipt of the spatially-multiplexed RF output signals. The RF processing method includes generating the set of spatially-multiplexed RF output signals by performing a splitting and weighting operation upon plural RF input signals. This splitting and weighting operation utilizes a first set of RF weighting values selected in accordance with one or more output signal-to-noise ratios of the receiver averaged over the channel. The method further includes forming a second plurality of spatially-multiplexed received RF signals by performing a weighting and combining operation upon the first plurality of spatially-multiplexed received RF signals. This weighting and combining operation utilizes a second set of RF weighting values selected in accordance with the one or more output signal-to-noise ratios.

The present invention also relates to a signal weighting and combining method implemented within a receiver having a plurality of receive antennas disposed to produce a corresponding plurality of spatially-multiplexed received RF signals in response to spatially-multiplexed transmitted RF signal energy received over a channel. The method includes weighting each of the plurality of spatially-multiplexed received RF signals utilizing a corresponding set of RF weighting values selected in accordance with one or more output signal-to-noise ratios of the receiver averaged over the channel, thereby forming plural spatially-multiplexed weighted RF signals. Ones of the plural spatially-multiplexed weighted RF signals are then combined in order to form one or more spatially-multiplexed combined RF signals.

In yet another aspect the present invention pertains to an RF splitting and weighting method implemented within a multi-antenna transmitter configured with a plurality of transmit antennas disposed to transmit a spatially-multiplexed RF input signal. The corresponding plurality of spatially-multiplexed RF output signals produced by the plurality of transmit antennas are received by a receiver after propagating through a channel. The method includes dividing the spatially-multiplexed RF input signal in order to form a plurality of spatially-multiplexed divided RF signals. The plurality of spatially-multiplexed divided RF signals are then weighted utilizing a set of RF weighting values selected in accordance with one or more output signal-to-noise ratios of the receiver averaged over the channel, in order to form plural spatially-multiplexed weighted RF signals. Ones of the plural spatially-multiplexed weighted RF signals are then combined so as to form the plurality of spatially-multiplexed RF output signals.

The present invention further relates to an RF processing method capable of being implemented within a communication system including a transmitter and a receiver. The transmitter is configured with a set of transmit antennas disposed to transmit a set of RF output signals through a channel. The receiver includes a plurality of receive antennas disposed to generate a corresponding plurality of received RF signals in response to receipt of the RF output signals. The method includes generating the set of RF output signals by performing a splitting and weighting operation upon an RF input signal utilizing a first set of RF weighting values selected to maximize an output signal-to-noise ratio of the receiver averaged over the channel. The method further includes generating one or more received combined RF signals by performing a weighting and combining operation upon the plurality of received RF signals using a second set of RF weighting values selected to maximize the output signal-to-noise ratio.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Introduction

Figure 1A:
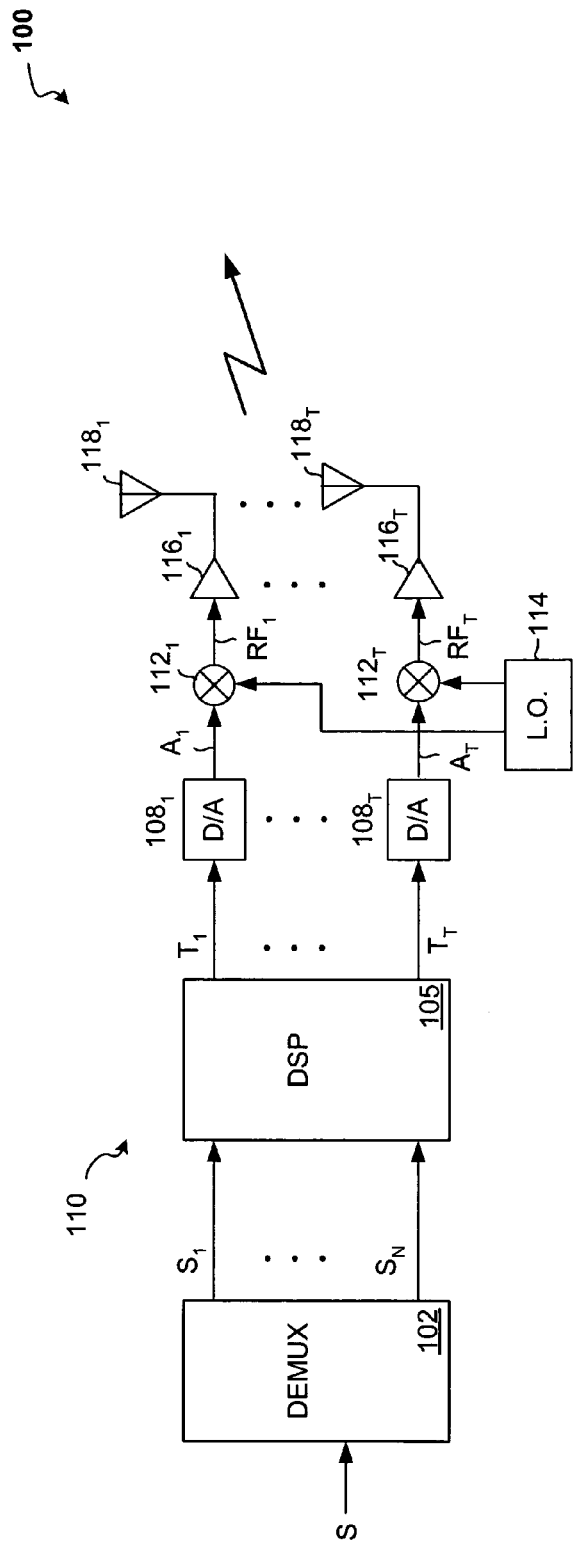
FIG. 1 illustratively represents a conventional MIMO communication system.

As is discussed below, the present invention is directed to a method of weighting and combining for use in multi-antenna systems, including N-fold spatially-multiplexed multi-antenna systems. In a particular embodiment of the invention, the weighting values for a given signal combining arrangement are set so as to maximize the output signal-to-noise ratio of the applicable multi-antenna system. The inventive weight generation method may be employed within several different types of multi-antenna communication systems including, for example, those described within the above-referenced copending non-provisional application. In particular embodiments the inventive technique may be applied to a multi-antenna receiver within a "single channel" system (i.e., a system lacking spatial multiplexing), to a multi-antenna transmitter in a single channel system, or to the transmitter or receiver of a MIMO system employing spatial multiplexing.

The present invention contemplates that the weighting values or "weights" may generally be calculated from the eigenvector corresponding to the largest eigenvalue of the average channel cross-correlation matrix. The average is taken over a given channel domain, including the frequency bandwidth, the tap delay profile, the time impulse response, or the Rake fingers profile.

When the teachings of the invention are applied to a multi-antenna receiver structure incorporating an RF-based weighting and combining arrangement, a single frequency-independent weight is typically defined such that the constituent set of weight coefficients are constant over a given channel domain. That is, the weight coefficients will generally be invariant over the frequency bandwidth, tap delay profile, time impulse response, and the Rake fingers profile of the channel. In this case the weights are chosen so as to maximize the output signal-to-noise ratio of the receiver as averaged over the applicable channel, which results in generation of a one-dimensional weight vector $\underline{w}$ that is common to the entire channel frequency band. A substantially similar approach may be used to generate the values for the weighting elements of RF-based weighting and combining arrangements configured for inclusion within multi-antenna transmitter structures.

When a multi-antenna receiver structure is configured to include both RF-based and baseband weighting and combining arrangements, the weighting values for the baseband arrangement are typically computed in a manner consistent with the invention over both space and frequency. Each such computation is performed so as to maximize the output signal-to-noise ratio with respect to a given signal component (e.g., a signal tone or tap delay) with knowledge of the channel frequency response associated with such signal component. Once the baseband weights have been computed an M-dimensional weight vector $\underline{w}_k$ is formed, where M denotes the number of antenna elements of the multi-antenna receiver structure. During operation, signals incident upon the M antenna elements of the receiver structure are collected into an M-dimensional received signal vector. Each signal component inherent within each of the M received signals represented by the M-dimensional received signal vector is then multiplied by the M-dimensional weight vector $\underline{w}_k$. A substantially similar approach may be used to generate the values for the weighting elements of baseband weighting and combining arrangements incorporated within multi-antenna transmitter arrangements.

The method of the present invention may also be used to facilitate weight generation in a multiple-input-multiple-output (MIMO) communication system having a transmitter operative to broadcast a number (N) of spatially-multiplexed signals (using at least N transmit antennas). In this case the receiver includes a number (M) of receive antennas that is greater than the number N of spatially-multiplexed signals. In order to effect RF-based weighting, the received signals are split, weighted and combined at RF using frequency-independent weights to form a set of N output signals, each of which is fed to a corresponding RF chain for processing at baseband. The inventive method thus permits the output signal-to-noise ratio to be maximized in multi-antenna systems with temporal/frequency domain processing using low cost RF weighting.

In order to facilitate appreciation of the principles of the invention, an overview is provided of exemplary architectures for implementing weighting and combining within such multi-antenna systems. This overview is followed by a detailed description of the inventive method of weight generation, which may be applied within the context of such weighting and combining schemes.

Overview of System Architecture

The above-referenced non-provisional copending patent application discloses a method and apparatus for use in a wireless communication system which permits a smaller number of RF chains to be used within a transmitter and/or receiver than the number of transmit/receiver antennas utilized. In an exemplary implementation of the disclosed system within a spatially-multiplexed MIMO communication arrangement, a number (N) of RF chains are used in support of N-fold spatial multiplexing.

In the disclosed system, the signal provided by each of M (M>N) antennas of a receiver is passed through a low noise amplifier and then split, weighted and combined in the RF domain with the signals from the other antennas of the receiver. This forms N RF output signals, which are then passed through N RF chains. In this exemplary implementation each RF chain includes a filter, downconverter, and A/D converter. The output signals produced by the A/D converter of each RF chain are then digitally processed to generate the N spatially-multiplexed output signals. By performing the requisite weighting and combining at RF using relatively inexpensive components, an N-fold spatially-multiplexed system having more than N receive antennas, but only N RF chains, can be realized at a cost similar to that of a system having N receive antennas. That is, receiver performance may be improved through use of additional antennas at relatively low cost.

A similar technique can be used at a transmitter incorporating N RF chains and more than N transmit antennas. Specifically, in the exemplary embodiment the N RF chains are followed by RF splitters, weighting elements and combiners collectively operative to generate signals for each of the more than N transmit antennas. As at the receiver, by performing such weighting and combining in the RF domain using relatively inexpensive components, an N-fold spatially-multiplexed system having more than N transmit antennas, but only N RF chains, can be realized at a cost similar to that of a system having N transmit antennas. That is, transmitter performance may be improved through use of additional antennas at relatively low cost.

The reduced-complexity antenna arrangement and receiver disclosed in the above-referenced non-provisional copending patent application is premised on performing, within the RF domain, some or all of the weighting and combining operations necessary for spatially-multiplexed communication. These operations may be performed using a plurality of RF chains within each transmitter/receiver that are fewer in number than the number of transmit/receive antennas deployed.

Spatial Multiplexing

As is known, spatial multiplexing (SM) provides a mode of signal transmission predicated upon the use of multiple antennas at both a transmitter and a receiver in such a way that the bit rate of a wireless radio link may be increased without correspondingly increasing power or bandwidth consumption. In the case in which N antennas are used at both a transmitter and a receiver, an input stream of information symbols provided to the transmitter is divided into N independent substreams. Spatial multiplexing contemplates that each of these substreams will occupy the same "channel" (e.g., time slot, frequency, or code/key sequence) of the applicable multiple-access protocol. Within the transmitter, each substream is separately applied to the N transmit antennas and propagated over an intervening multipath communication channel to a receiver. The composite multipath signals are then received by a receive array of N receive antennas deployed at the receiver. At the receiver, a "spatial signature" defined by the N phases and N amplitudes arising at the receive antenna array for a given substream is then estimated. Signal processing techniques are then applied in order to separate the received signals, which permits the original substreams to be recovered and synthesized into the original input symbol stream. The principles of spatially-multiplexed communication and exemplary system implementations are further described in, for example, "Optimum combining for indoor radio systems with multiple users", by J. H. Winters, IEEE Transactions on Communications, Vol. COM-35, No. 11, November 1987, which is hereby incorporated by reference in its entirety.

Conventional MIMO System

Figure 1B:
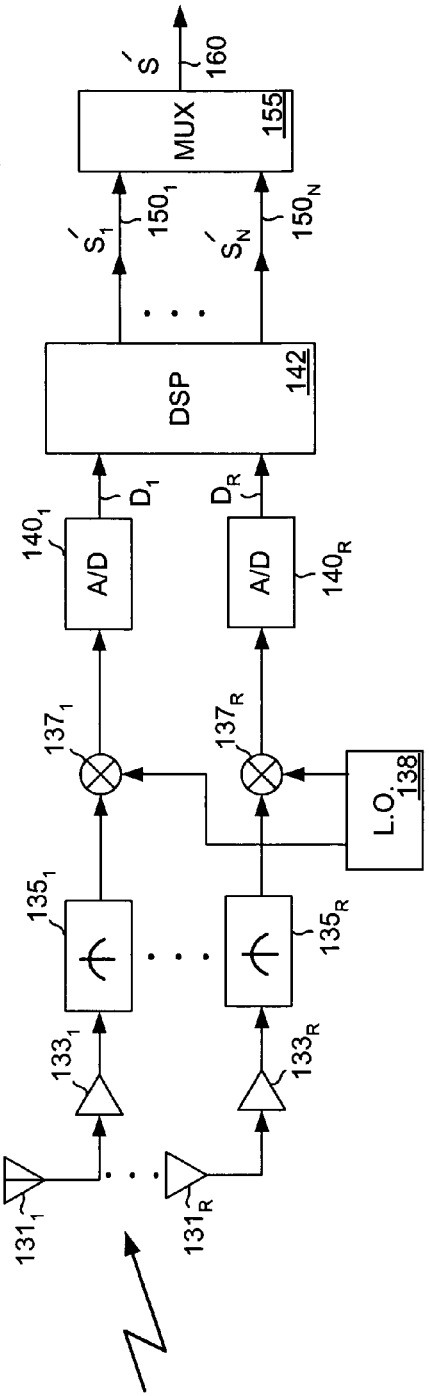

The utility of the weight generation technique of the present invention may be more fully appreciated by first considering a conventional MIMO communication system, which is illustratively represented by FIG. 1. As shown, the MIMO system 100 of FIG. 1 includes a transmitter 110 depicted in FIG. 1A and a receiver 130 depicted in FIG. 1B. The transmitter 110 and receiver 130 include a set of T transmit RF chains and a set of R receive RF chains, respectively, which are configured to transmit and receive a group of N spatially-multiplexed signals. Within the system 100 it is assumed that either (i) T is greater than N and R is equal to N, (ii) T is equal to N and R is greater than N, or (iii) both T and R are greater than N.

Referring to FIG. 1A, an input signal S to be transmitted, which typically consists of a stream of digital symbols, is demultiplexed by demultiplexer 102 into N independent substreams $S_{1, 2 \ldots, N}$. The substreams $S_{1, 2 \ldots, N}$ are then sent to digital signal processor (DSP) 105, which generates a set of T output signals $T_{1, 2 \ldots, T}$. The T output signals $T_{1, 2 \ldots, T}$ are typically generated from the N substreams $S_{1, 2 \ldots, N}$ by weighting, i.e., multiplying by a complex number, each of the N substreams $S_{1, 2 \ldots, N}$ by T different weighting coefficients to form NT substreams. These NT substreams are then combined in order to form the T output signals $T_{1, 2 \ldots, T}$. The T output signals $T_{1, 2 \ldots, T}$ are then converted to T analog signals $A_{1, 2 \ldots, T}$ using a set of T digital-to-analog (D/A) converters 108. Each of the T analog signals $A_{1, 2 \ldots, T}$ is then upconverted to the applicable transmit carrier RF frequency within a mixer 112 by mixing with a signal provided by a local oscillator 114. The resulting set of T RF signals (i.e., $RF_{1, 2 \ldots, T}$) are then amplified by respective amplifiers 116 and transmitted by respective antennas 118.

Referring now to FIG. 1B, the RF signals transmitted by the transmitter 110 are received by a set of R receive antennas 131 deployed at the receiver 130. Each of the R signals received by an antenna 131 is amplified by a respective low noise amplifier 133 and passed through a filter 135. The resultant filtered signals are then each down-converted from RF to baseband using mixers 137, each of which is provided with a signal from local oscillator 138. Although the receiver of FIG. 1B is configured as a homodyne receiver, a heterodyne receiver characterized by an intermediate IF frequency could also be used. The respective R baseband signals produced by the mixers 137 are then converted to digital signals using a corresponding set of R analog-to-digital (A/D) converters 140. The resulting R digital signals $D_{1, 2 \ldots, R}$ are then weighted and combined using digital signal processor 142 to form N spatially-multiplexed output signals $S'_{1, 2 \ldots, N}$, which comprise estimates of the transmitted signals $S_{1, 2 \ldots, N}$. The N output signals $S'_{1, 2, \ldots, N}$ are then multiplexed using a multiplexer 155 in order to generate an estimate 160 (S') of the original input signal S.

RF Weighting and Combining in Spatially-Multiplexed Communication Systems

Turning now to FIG. 2, there is shown a block diagram of a MIMO communication system 200 having a transmitter 210 and receiver 250 configured in accordance with the principles of the above-referenced non-provisional patent application. In the implementation of FIG. 2 the transmitter 210 and receiver 250 effect N-fold spatial multiplexing using only N transmit/receive RF chains, even though more than N transmit/receive antennas are respectively deployed at the transmitter 210 and receiver 250. Specifically, the transmitter 210 includes a set of MT transmit antennas 240 and the receiver includes a set of MR receive antennas 260, it being assumed that either (i) MT is greater than N and MR is equal to N, (ii) MT is equal to N and MR is greater than N, or (iii) both MT and MR are greater than N.

Figure 2A:
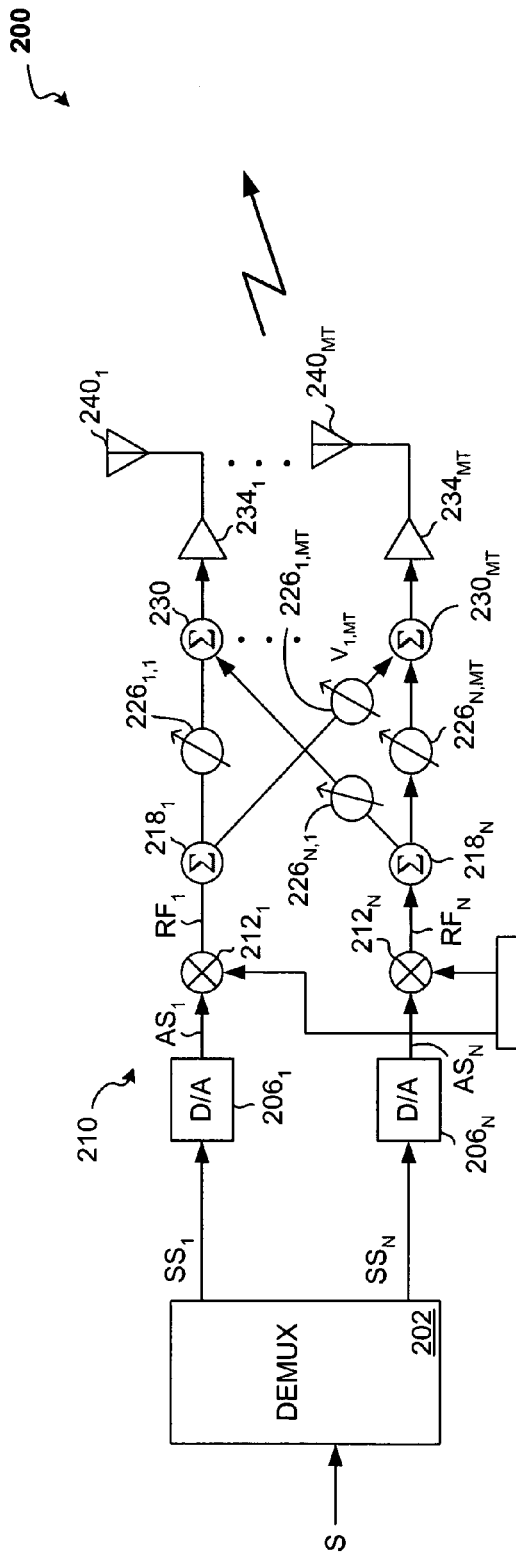
FIG. 2 shows a block diagram of a MIMO communication system having a transmitter and a receiver configured to effect RF-based weighting and combining.

As shown in FIG. 2A, an input signal S to be transmitted is demultiplexed by demultiplexer 202 into N independent substreams $SS_{1, 2, \ldots, N}$. The substreams $SS_{1, 2, \ldots, N}$ are then converted to N analog substreams $AS_{1, 2, \ldots, N}$ using a corresponding set of D/A converters 206. Next, the N analog substreams $AS_{1, 2, \ldots, N}$ are upconverted to the applicable transmit carrier RF frequency using a set of mixers 212 provided with the signal produced by a local oscillator 214. The resultant N RF signals (i.e., $RF_{1, 2, \ldots, N}$) are then each split MT ways by dividers 218 in order to form N·(MT) RF signals. These N·(MT) RF signals are each weighted using complex multipliers $226_{x,y}$, where x identifies a signal origination point at one of the N dividers 218 and y identifies a corresponding signal termination point at one of a set of MT combiners 230. The weighted RF signals are combined using the combiners 230, thereby yielding a set of MT output signals. A corresponding set of MT amplifiers 234 then amplify these MT output signals, with the amplified output signals then being transmitted using the MT antennas 240. The weighting values of the complex multipliers $226_{x,y}$ may be generated so as to maximize the SNR of the output signal at the receiver.

Figure 2B:
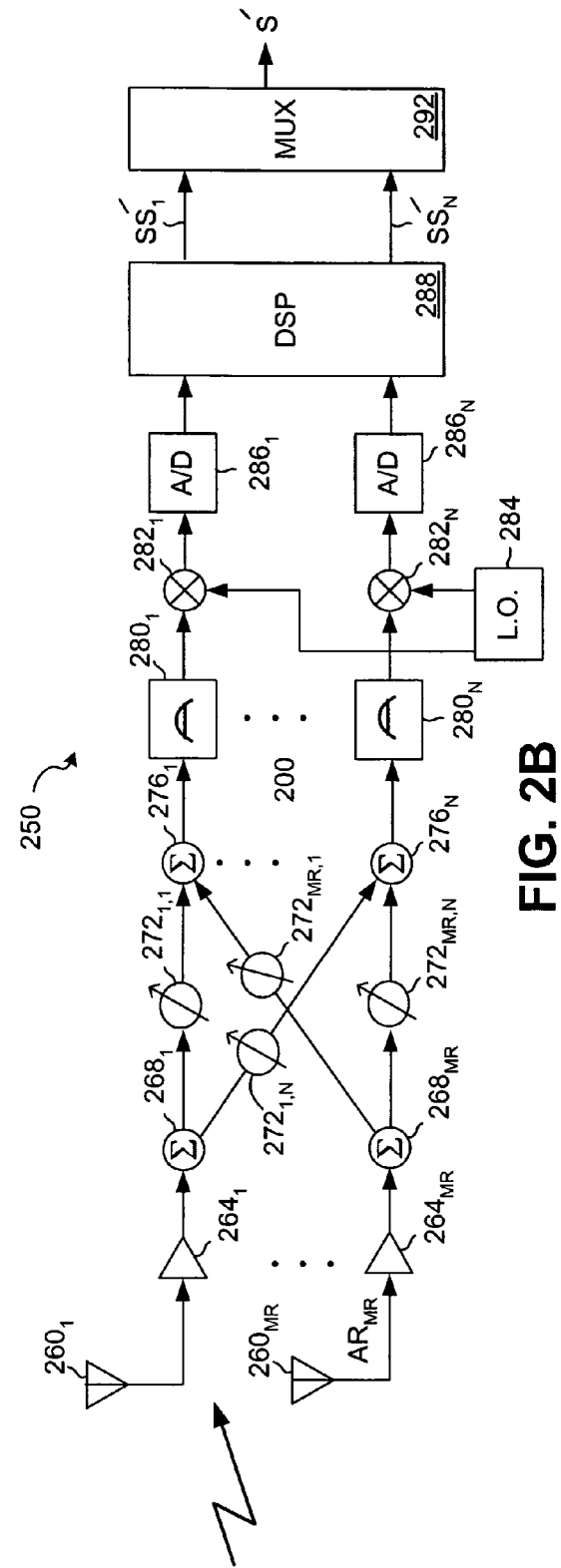

Referring to FIG. 2B, the MT RF signals transmitted by the transmitter 210 are received by the set of MR receive antennas 260 deployed at the receiver 250. Each of the MR received signals is amplified by a respective low noise amplifier 264 and then split N ways by one of a set of MR dividers 268. The resulting MR·(N) split signals are then each weighted by respective weighting circuits $272_{x,y}$, where x identifies a signal origination point at one of the MR dividers 268 and y identifies a corresponding signal termination point at one of a set of N combiners 276. These weighted signals are then combined using the N combiners 276 in order to form a set of N signals, which are passed through a corresponding set of N filters 280. The resulting N filtered signals are then downconverted to baseband using a set of N mixers 282, each of which is provided with a carrier signal produced by a local oscillator 284. Although the receiver 250 is realized as a homodyne receiver in the embodiment of FIG. 2B, it could also be implemented as a heterodyne receiver characterized by an intermediate IF frequency. The N baseband signals produced by the mixers 282 are then converted to digital signals via a corresponding set of N A/D converters 286. The N digital signals are then further processed using digital signal processor 288 to form the N spatially-multiplexed output signals $SS'_{1, 2, \ldots, N}$, which are the estimates of the N independent substreams $SS_{1, 2, \ldots, N}$. The N output signals $SS'_{1, 2, \ldots, N}$ are then multiplexed via a multiplexer 292 in order to generate the output signal S', which is an estimate of the input signal S.

It is observed that the transmitter 210 and receiver 250 are capable of implementing, within the RF domain, the same spatial weighting or linear combining schemes as are conventionally implemented at baseband via the system 100 of FIG. 1. However, the DSP 288 within the inventive receiver 250 may still perform many other baseband signal processing operations potentially effected within the system 100, such as, for example, successive interference cancellation (see, e.g., "V-BLAST: An architecture for realizing very high data rates over the rich-scattering wireless channel", *Proceedings of URSI ISSSE*, September 1998, pp. 295-300). Again, it is a feature of the disclosed system that only N transmit/receive RF chains need be employed, even when substantially more than N transmit/receive antennas are deployed.

The inventive weight generation technique has applicability to, for example, (i) receivers using multiple antennas in what are referred to herein as single channel systems (i.e., system lacking spatial multiplexing), (ii) transmitters using multiple antennas in single channel systems, and (iii) systems in which a smaller number of RF chains are used at the transmitter and/or receiver than the number of transmit/receiver antennas in a MIMO system with spatial multiplexing.

Although the weight generation techniques described herein may be utilized in the development of RF-based weighting and combining schemes implemented using low-cost RF components, the teachings of the present invention are equally applicable to implementations containing both RF-based and baseband weighting and combining arrangements. Accordingly, both RF-based and baseband weighting and combining schemes are described hereinafter. In this regard various implementations using the weighting techniques of the invention may include only RF weighting and combining schemes while others contemplate use of both RF and baseband weighting and combining schemes. In general, it is expected that weighting and combining consistent with the description herein may be more economically performed in the RF domain than at baseband, but that implementations including both RF-based and baseband combining arrangements may in certain cases offer superior performance results.

Weight Generation Method for RF Weighting and Combining Based on Maximum Output Signal-To-Noise Ratio In accordance with one aspect of the present invention, the weighting values or "weights" used during the RF-based weighting and combining process described herein are selected so as to maximize the output signal-to-noise ratio of the applicable multi-antenna system. In general, the embodiments described below are configured such that the signals received by multiple antennas are weighted and combined at RF using a single frequency-independent weight for each antenna. In an exemplary embodiment a single frequency-independent weight is defined such that the weight coefficients are constant over a given channel domain, including the frequency bandwidth, the tap delay profile, the time impulse response, and the Rake fingers profile. The weight generation method of the invention enables calculation of the weights that maximize the output signal-to-noise ratio, as averaged over the channel. Furthermore, the method of the invention can also be used for weight generation at the transmitter when multiple antennas are used for transmission, with the transmitted signal split and weighted at RF using a single frequency-independent weight for each transmit antenna.

As is described in further detail below, in one embodiment of the invention it is contemplated that weights be selected on the basis of the eigenvector corresponding to the largest eigenvalue of the average channel cross-correlation matrix. Again, the average is taken over a given channel domain, including the frequency bandwidth, the tap delay profile, the time impulse response, or the Rake fingers profile. In the case of a multi-antenna receiver in a single channel system where the OFDM modulation is employed, the weights are given by the eigenvector corresponding to the largest eigenvalue of the channel cross-correlation matrix averaged over the bandwidth of the signal. For the multi-antenna transmitter in a single channel system, the weights are given by the eigenvector corresponding to the largest eigenvalue of the cross-correlation matrix of the transpose conjugate of the channel averaged over the bandwidth of the signal.

A slightly different approach is taken in cases involving a multi-antenna transmitter and a multi-antenna receiver in a single channel system. Specifically, in this case the weights for the transmitter are given by the eigenvector corresponding to the largest eigenvalue of the cross-correlation matrix of the product of (i) the transpose conjugate of the channel, and (ii) the receiver weights, where the product is averaged over the bandwidth of the signal. The weights for the receiver are given by the eigenvector corresponding to the largest eigenvalue of the cross-correlation matrix of the product of (i) the channel, and (ii) the transmitter weights, where the product is averaged over the bandwidth of the signal. This approach is also used to determine the weights for each signal at a transmitter and a receiver disposed within a MIMO system utilizing spatial multiplexing. In this case each such weight is a function of the channel propagation matrix and channel cross-correlation matrix corresponding to the signal of interest.

In the case of a multi-antenna receiver in a single channel system utilizing direct sequence spread spectrum modulation, the weights are given by the eigenvector corresponding to the largest eigenvalue of the channel cross-correlation matrix averaged over the multiple tap delays or the Rake finger profile of the signal.

Exemplary Scenarios

The weight generation techniques of the present invention will be described hereinafter with reference to the exemplary scenarios illustratively represented by FIGS. 3-10. Specifically, the weight generation methods will be explained within the context of the following four scenarios: 1) a receiver using multiple antennas in a single channel SIMO system without spatial multiplexing, 2) a transmitter using multiple antennas in a single channel multiple-input single output (MISO) system without spatial multiplexing, 3) a transmitter using multiple antennas and a receiver using multiple antennas in a single channel MIMO system without spatial multiplexing, and 4) a system whereby a smaller number of RF chains are used at the transmitter and/or receiver than the number of transmitter/receiver antennas in a MIMO system with spatial multiplexing. Again, implementations involving exclusively RF-based weighting and combining arrangements, as well as with both RF-based and baseband arrangements, are described for each of the preceding cases.

For illustrative purposes, many of the following examples are described with reference to systems utilizing OFDM modulation; however, the application of the invention to an exemplary system based upon a direct sequence spread spectrum (DS-SS) has also been described. The DS-SS receiver can be extended to include the spatial domain in the form of a space-time Rake receiver, which is operative to combine the multi-path taps in the temporal and spatial domains. This extension illustrates that the techniques described herein may be generalized to virtually any system employing temporal/frequency domain processing in a frequency-selective fading environment.

Figure 3:
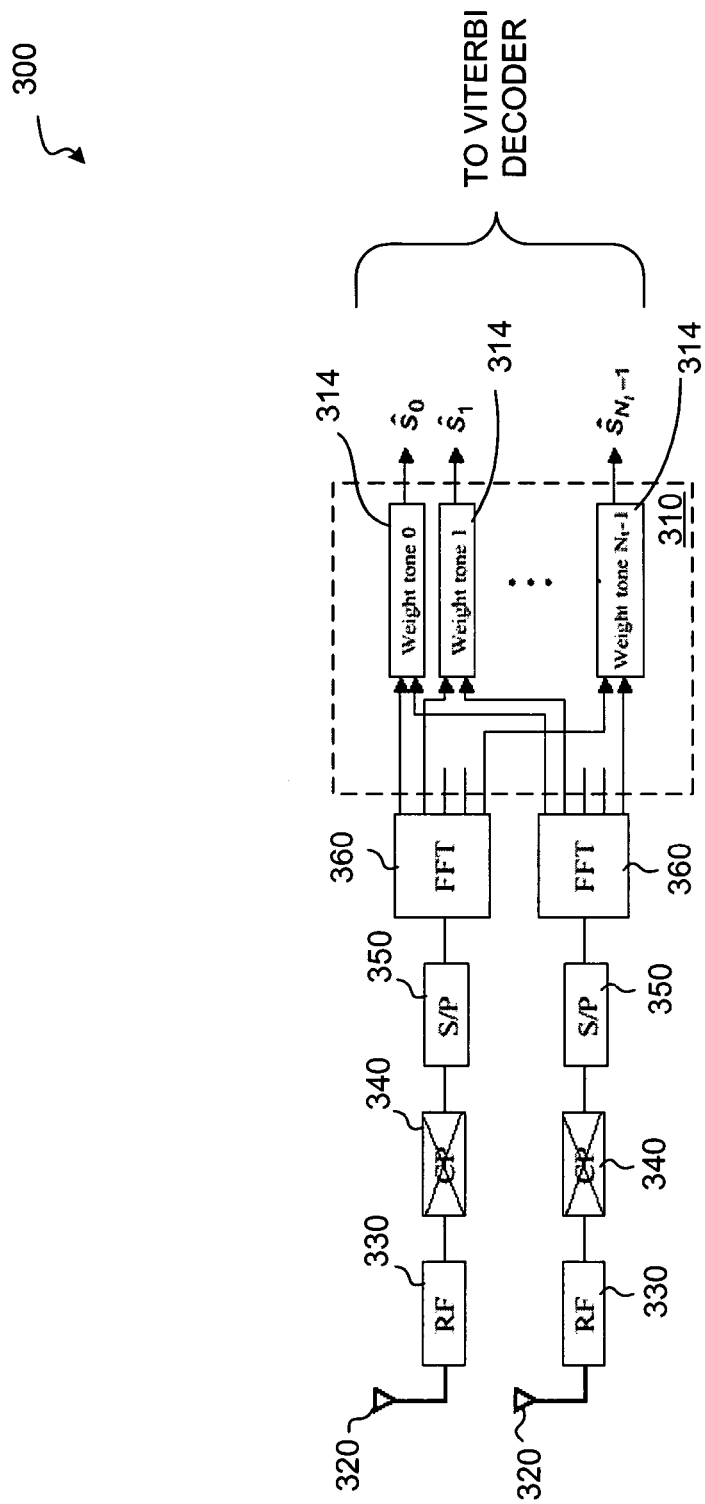
FIG. 3 depicts a receiver structure in a single-channel (SC) single-input-multiple-output (SIMO)-OFDM system in the case in which a baseband combining arrangement is used.

FIG. 3 depicts a receiver structure 300 in a SC-SIMO system in the case in which a baseband combining arrangement 310 is used. Such a baseband combining arrangement may be incorporated within a SC-SIMO receiver structure which also contains an RF-based weighting and combining arrangement (see, e.g., FIG. 4 and the accompanying discussion). In this way a portion of the requisite weighting and combining is performed within the RF domain and the balance at baseband.

The values of the baseband weighting elements 314 utilized within the receiver structure 300 are computed over both space and frequency in accordance with the invention. Exemplary implementations of the receiver structure of FIG. 3 adhere to the requirements of the 802.11a standard. That is, the transmitter (not shown) in communication with the receiver structure 300 uses OFDM modulation, where a stream of $N_t$ consecutive quadrature amplitude modulation (QAM)-modulated data symbols, denoted by $\{s_o, s_1, \ldots, s_{N_t-1}\}$ is modulated onto a set of $N_t$ orthogonal subcarriers, see, e.g., J. Heiskala and J. Terry, OFDM Wireless LANs: A Theoretical and Practical Guide, Sams Publishing, December 2001. At the receiver 300, the signal received at each antenna element 320 is demodulated and down-converted from RF to baseband within RF chain 330. Then the cyclic prefix (CP), which was added at the transmitter to mitigate inter-symbol interference (ISI), is removed 340. The symbols, via a serial-to-parallel conversion 350, are then mapped to the subcarriers of a 64-point fast Fourier transform (FFT) 360.

In a noise-limited scenario, the reconstructed data signal at the output of the FFT 360 of the $i^{th}$ receive antenna element 320 for the k-th tone is given by $$r_{i,k} = H_i\left(e^{j\frac{2\pi}{N_t}k}\right) \cdot s_k + n_{i,k} \tag{1.}$$

where H is the channel frequency response of the L-tap channel impulse response denoted by $\{h_o, h_1, \ldots, h_{L-1}\}$ and n is complex-valued additive white Gaussian noise (AWGN) with zero-mean and variance $\sigma^2$. The relationship between frequency-domain H and time-domain h is:

$$H\left(e^{j\frac{2\pi}{N_t}k}\right) = \sum_{l=0}^{L-1} h_l e^{-j\frac{2\pi}{N_t}lk} \tag{2.}$$

The received signals from each antenna element 320 are collected in an M-dimensional vector, where M is the number of receive antenna elements. The received vector at tone k becomes:

$$\underline{r}_k = \underline{H}_k \cdot s_k + \underline{n}_k \tag{3.}$$

where $\underline{r}_k = [r_{1,k}, r_{2,k}, \ldots r_{M,k}]^T$,

-continued $$H_k = \left[H_1\left(e^{j\frac{2\pi}{N_t}k}\right), H_2\left(e^{j\frac{2\pi}{N_t}k}\right), \ldots, H_M\left(e^{j\frac{2\pi}{N_t}k}\right)\right]^T, \text{ and}$$

$\underline{n}_k = [n_{1,k}, n_{2,k}, \ldots n_{M,k}]^T$ are all M-dimensional vectors.

The received vector is multiplied at each tone by an M-dimensional weight vector $\underline{w}_k$. The resulting output signal at tone k is given by $$y_k = \underline{w}_k^H \cdot \underline{r}_k = \underline{w}_k^H \underline{H}_k \cdot s_k + \underline{w}_k^H \underline{n}_k \quad (4.)$$

The corresponding output signal-to-noise ratio (SNR) at tone k is $$SNR_k = \frac{\sigma_s^2}{\sigma^2} \frac{\underline{w}_k^H \underline{H}_k \underline{H}_k^H \underline{w}_k}{\underline{w}_k^H \underline{w}_k} \quad (5.)$$

where $\sigma_s^2 = E[s_k s_k^*]$ and $\sigma^2 = E[n_k n_k^*]$ are considered constant over the frequency domain.

In a noise-limited scenario, the weight maximizing the output SNR at tone k is:

$$\underline{w}_k = \underline{H}_k / \|\underline{H}_k\|^2 \quad (6.)$$

The corresponding output signal $y_k$ becomes $$y_k = \hat{s}_k = s_k + \frac{\underline{H}_k^H}{\|\underline{H}_k\|^2} \underline{n}_k$$

where $y_k$ corresponds to the estimate of the data symbol transmitted on tone k.

The corresponding maximum output SNR is then $$SNR_{max,k} = \frac{\sigma_s^2}{\sigma^2} \|\underline{H}_k\|^2 = \frac{\sigma_s^2}{\sigma^2} \sum_{i=1}^{M} \left|H_i\left(e^{j\frac{2\pi}{N_t}k}\right)\right|^2 \quad (7.)$$

This corresponds to the Maximum Ratio Combining (MRC) solution, where the output SNR at tone k is the sum of the individual SNR received at each antenna element at tone k.

It is observed that the use of linear combining weights can lead to channel noise enhancement. Whenever a convolutional encoder is used at the transmitter, the information about the output noise on each individual sub-carrier should be incorporated into the Viterbi algorithm used at the receiver to provide significant performance improvement in fading channels, as shown in J. Heiskala and J. Terry, OFDM Wireless LANs: A Theoretical and Practical Guide, Sams Publishing, December 2001. Specifically, each "soft" bit entering the Viterbi decoder is weighted by a factor that is inversely proportional to the "enhanced" noise, such noise being a function of the sub-carrier channel on which the soft bit was transmitted. This adjustment allows the convolutional decoder to apply different weights to the information it receives from different tones. In this way the contribution of the information from tones experiencing poor channel conditions may be diminished by the weighting, while the contribution of information from tones experiencing favorable channel conditions may be augmented. Such variable weighting is expected to result in improved performance under frequency-varying conditions.

The computation of the metric weighting used in Viterbi decoding proceeds as follows:

The error signal at tone k is expressed as:

$$e(k) = s_k - \underline{w}_k^H \cdot \underline{r}_k = s_k(1 - \underline{w}_k^H \cdot \underline{H}_k) - \underline{w}_k^H \cdot \underline{n}_k \quad (8.)$$

The mean squared error (MSE)—or post-combining noise variance—is thus $$\Sigma_H = E|e(k)|^2 = E|s_k|^2 (1 - \underline{w}_k^H \cdot \underline{H}_k)(1 - \underline{H}_k^H \cdot \underline{w}_k) + \sigma^2 \underline{w}_k^H \underline{w}_k \quad (9.)$$

$$\Sigma_H = \sigma_s^2 (1 - \underline{H}_k^H \cdot \underline{w}_k - \underline{w}_k^H \cdot \underline{H}_k + \underline{w}_k^H \cdot \underline{H}_k \underline{H}_k^H \cdot \underline{w}_k) + \sigma^2 \underline{w}_k^H \underline{w}_k \quad (10.)$$

With $\underline{w}_k = \underline{H}_k / \|\underline{H}_k\|^2$ from (6), then $\Sigma_H = \sigma^2 / \|\underline{H}_k\|^2$.

Since $\sigma^2$ assumed to be constant over the frequency bandwidth, it can be ignored without affecting the performance of the Viterbi decoder. The metrics weighting (MW), denoted by MW(k), are then $$\Sigma'_H = 1/\|\underline{H}_k\|^2; \quad MW(k) = 1/\Sigma'_H = \|\underline{H}_k\|^2 \quad (11.)$$

Each bit composing the symbol $s_k$ is weighted by MW(k).

In summary, the present case contemplates that a different weight be computed at each tone based on the knowledge of the channel frequency response at the tone so as to maximize the output SNR at the tone. Unfortunately, straightforward implementation of this approach results in incurring the expense of dedicating one RF chain to each receive antenna.

The next case considered is one in which the spatial received signals are combined in the RF domain such that only a single RF chain need be used. This approach advantageously minimizes costs within the applicable user equipment. As is discussed below, the weighting element values are derived consistent with the present invention using this approach by maximizing the average output signal-to-noise ratio over the signal bandwidth of interest.

Figure 4:
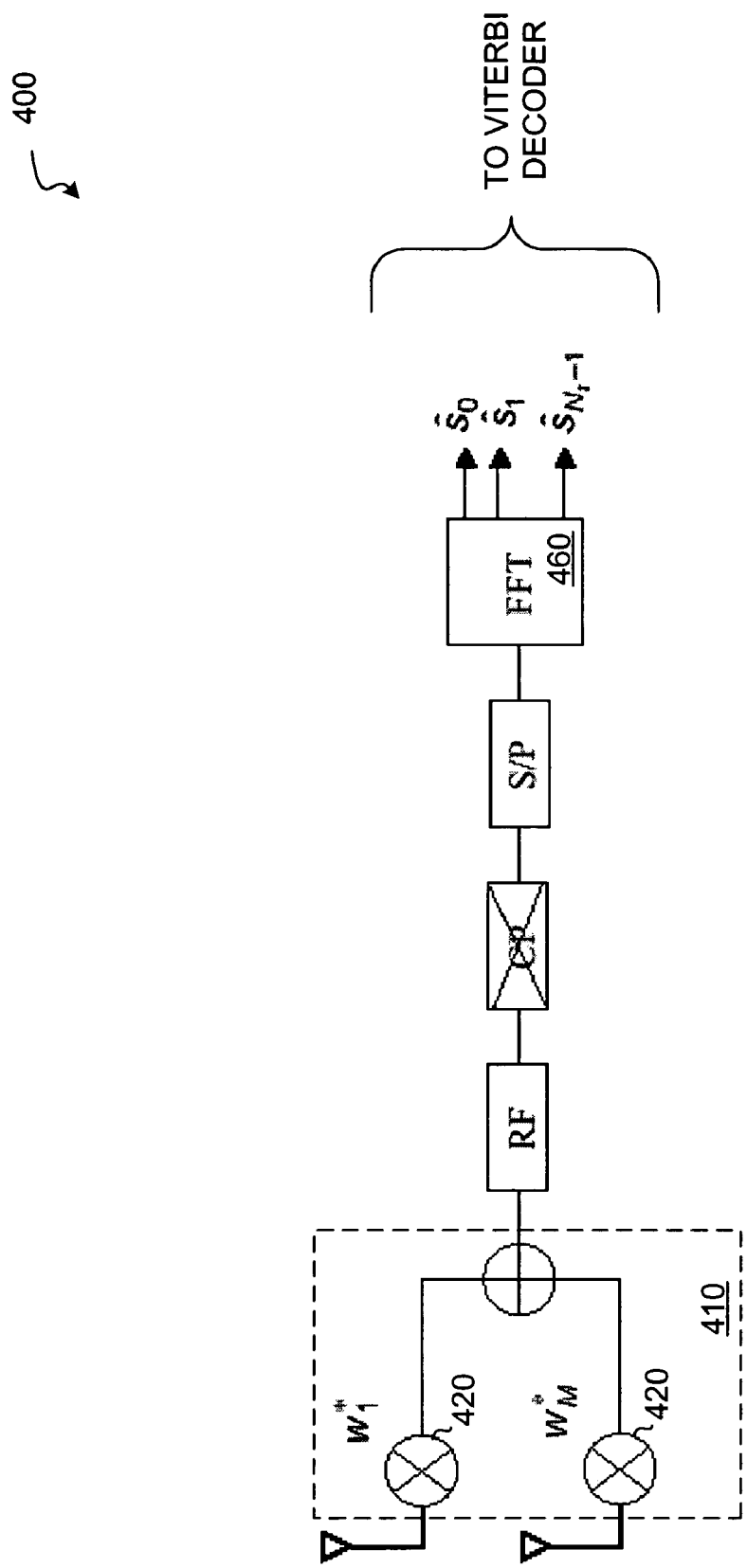
FIG. 4 depicts the receiver structure in a SC-SIMO-OFDM system in the case in which an RF-based weighting and combining network is employed.

FIG. 4 depicts a receiver structure 400 in a SC-SIMO system in the case in which an RF-based weighting and combining network 410 is employed. In this case the weights 420 may be defined by a one-dimensional vector that is common to all tones. The computation of the weights 420 may be carried out in baseband, in which case the values of the weights 420 are fed back to the RF domain via an internal bus.

As mentioned previously, in alternate implementations the RF-based weighting and combining arrangement within the receiver structure 400 may be complemented by a baseband weighting and combining arrangement. This results in a portion of the requisite weighting and combining being performed in the RF domain and the balance being effected at baseband.

In configuration depicted in FIG. 4, the output of the FFT 460 at tone k is given by $$y_k = \underline{w}^H \cdot \underline{r}_k = \underline{w}^H \underline{H}_k \cdot s_k + \underline{w}^H \underline{n}_k \quad (12.)$$

where $\underline{w}$ is an M-dimensional vector which no longer depends on the subscript k.

Based on (12), the output SNR at tone k is $$SNR_k = \frac{\sigma_s^2}{\sigma^2} \frac{\underline{w}^H \underline{H}_k \underline{H}_k^H \underline{w}}{\underline{w}^H \underline{w}} \quad (13.)$$

The sum of the individual SNRs across all tones is then $$\overline{SNR} = \sum_{k=0}^{N_t-1} SNR_k = \frac{\sigma_s^2}{\sigma^2} \frac{w^H \sum_{k=0}^{N_t-1} H_k H_k^H w}{w^H w} = \frac{\sigma_s^2}{\sigma^2} \frac{w^H HH^H w}{w^H w} \quad (14.)$$

where $H=[\underline{H}_0, \ldots, \underline{H}_{N_t-1}]$. In accordance with the invention, it is desired to find the weight vector $\underline{w}$ that maximizes the average output SNR (where the average is taken over the frequency tones). The problem reduces to $$\operatorname*{argmax}_{\underline{w}} \frac{\underline{w}^H HH^H \underline{w}}{\underline{w}^H \underline{w}} = \lambda_{max} \quad (15.)$$

Equation (15) is an eigenvalue problem (see S. Haykin, Adaptive Filter Theory, 3$^{rd}$ Ed., Prentice Hall, 1996), and $\underline{w}$ is the eigenvector corresponding to the largest eigenvalue $\lambda_{max}$ Of $HH^H$.

The solution is formulated as:

$$\underline{w}=eig(\lambda_{max}, HH^H) \quad (16.)$$

As a last step, the output signal $y_k$ is multiplied by a scalar such that the FFT output signal is expressed as a function of $s_k$ plus a noise residual component. Recall that the output of the FFT 460 at tone k is given by $$y_k = \underline{w}^H \underline{r}_k = \underline{w}^H \underline{H}_k \cdot s_k + \underline{w}^H \underline{n}_k \quad (17.)$$

Assume that $$\underline{w}^H \underline{H}_k = \alpha_k \quad (18.)$$

Then, the output signal $y_k$ is multiplied by a scalar $u_k$ such that $u_k^* \underline{w}^H \underline{H}_k = 1$. In this case, $u_k$ is given by $$u_k = \frac{\alpha_k}{|\alpha_k|^2} = \frac{\underline{w}^H \underline{H}_k}{\underline{w}^H \underline{H}_k \underline{H}_k^H \underline{w}} \quad (19.)$$

The scaled FFT output, denoted by $z_k$, becomes $$z_k = \hat{s}_k = u_k^* y_k = s_k + u_k^* \underline{w}^H \underline{n}_k \quad (20.)$$

Of course, the multiplication of $y_k$ by $u_k^*$ does not affect the output SNR at tone k (since it multiplies both signal and noise components). The output SNR at tone k is given by (13).

The computation of the metric weighting used in Viterbi decoding proceeds as follows:

The error signal at tone k is expressed as:

$$e(k) = s_k - u_k^* \underline{w}^H \underline{r}_k = s_k(1 - u_k^* \underline{w}^H \underline{H}_k) - u_k^* \underline{w}^H \underline{n}_k \quad (21.)$$

The MSE—or post-combining noise variance—is thus $$\Sigma_H = E|e(k)|^2 = \sigma^2 |u_k|^2 \underline{w}^H \underline{w} \quad (22.)$$

By using the expression of $u_k$ in (19), $\Sigma_H$ becomes $$\Sigma_H = \frac{\sigma^2 \underline{w}^H \underline{w}}{\underline{w}^H \underline{H}_k \underline{H}_k^H \underline{w}}$$

Since $\sigma^2$ is assumed to be constant over the frequency bandwidth, and $\underline{w}$ is also constant over frequency, the product $\sigma^2 \underline{w}^H \underline{w}$ can be ignored without affecting the performance of the Viterbi decoder. The metrics weighting (MW) denoted by MW(k) are then $$\Sigma'_H = \frac{1}{\underline{w}^H \underline{H}_k \underline{H}_k^H \underline{w}}; MW(k) = 1/\Sigma'_H = \underline{w}^H \underline{H}_k \underline{H}_k^H \underline{w} \quad (23.)$$

A derivation similar to that described above with reference to the case of a single-antenna transmitter and a multi-antenna receiver may be used to obtain the weights applicable to the case of a multi-antenna transmitter and a single-antenna receiver. The weight solutions are set forth below.

Weight Solution for Baseband Combining Arrangement

Consistent with one embodiment of the invention, the weight solution at each tone is the eigenvector of the matrix $\underline{H}_k^H \underline{H}_k$ corresponding to the largest eigenvalue.

$$\underline{w}_k = eig(\lambda_{max}, \underline{H}_k^H \underline{H}_k) \quad (24.)$$

where $\underline{H}_k$ is a row vector of size $1 \times n_T$ (with $n_T$ as the number of transmit antenna elements) which represents the channel frequency response at tone k.

Note that in order to keep the total transmit power P constant regardless of the number of transmit antennas, the norm of $\underline{w}_k$ is constrained such that:

$$\underline{w}_k^H \underline{w}_k = \|\underline{w}_k\|^2 = P/\sigma_s^2 \quad (25.)$$

Weight Solution for RF Combining Arrangement

The single frequency-independent weight solution that maximizes the output SNR in a SC-MISO system is given by the eigenvector of the matrix $H^H H$ corresponding to the largest eigenvalue.

$$\underline{w} = eig(\lambda_{max}, H^H H) \quad (26.)$$

where $H^H = [\underline{H}_0^H, \ldots, \underline{H}_{N_{t-1}}^H]$ is a $n_T \times N_t$ matrix.

In order to keep the total transmit power P constant regardless of the number of transmit antennas, the norm of $\underline{w}$ is constrained such that:

$$\underline{w}^H \underline{w} = \|\underline{w}\|^2 = P/\sigma_s^2 \quad (27.)$$

An RF-based weighting and combining arrangement may be implemented exclusively in the RF domain in accordance with the frequency-independent weight solution of (26) and (27), or may be supplemented by a baseband weighting and combining arrangement defined by (24) and (25).

Figure 5:
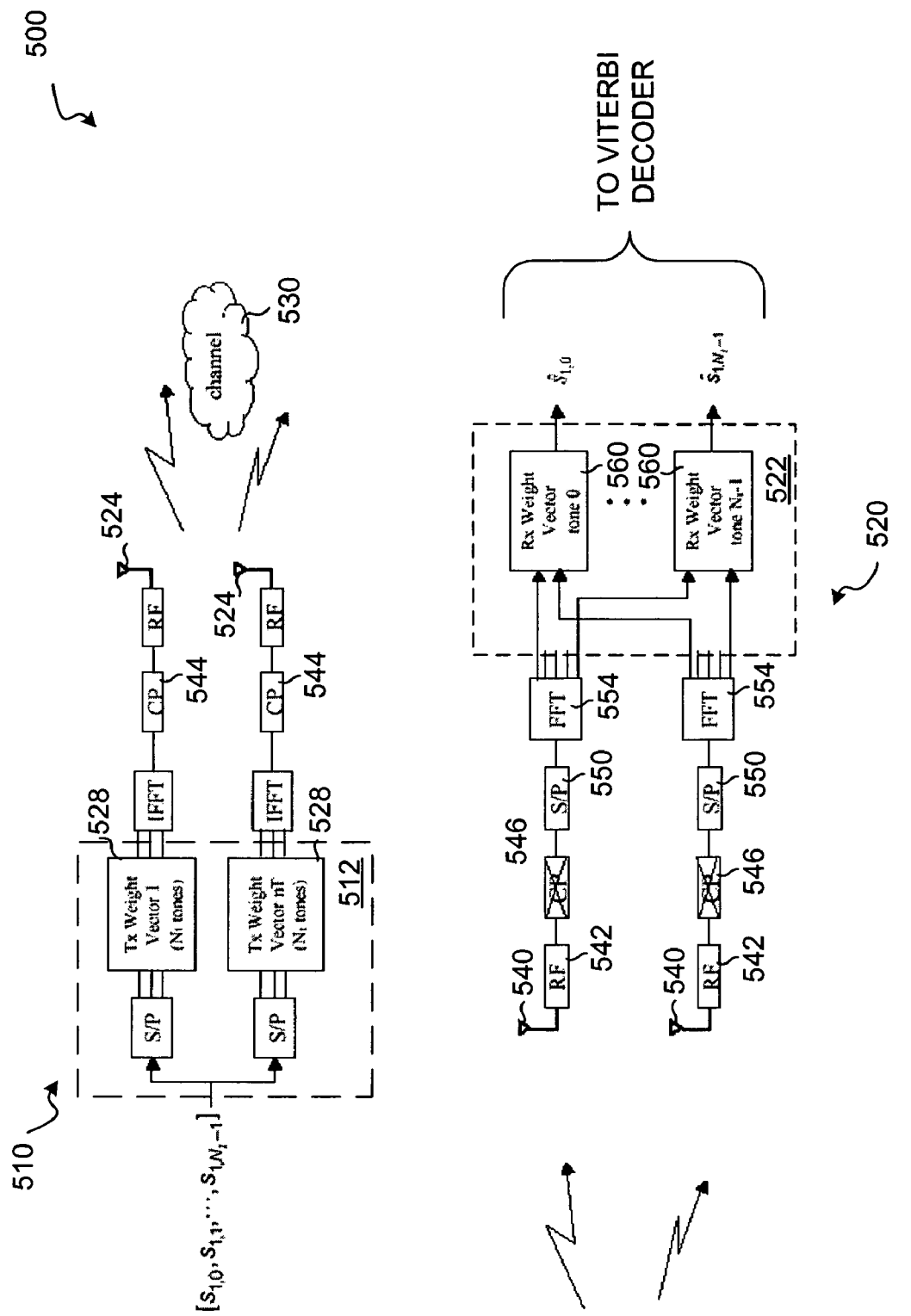
FIG. 5 depicts the transmitter and receiver structure of a SC-MIMO-OFDM system in the case in which a baseband combining arrangement is employed.

Turning now to FIG. 5, there is shown a transmitter 510 and a receiver 520 of a single channel (SC) MIMO-OFDM system 500 in the case in which a baseband combining arrangement is employed. Specifically, the transmitter 510 includes a Tx baseband combining arrangement 512 and the receiver 520 includes an Rx baseband combining arrangement 522. Such a baseband combining arrangement may be incorporated within SC MIMO-OFDM transmitter and receiver structures which also contain RF-based weighting and combining arrangements (see, e.g., FIG. 6 and the accompanying discussion). In this way a portion of the requisite weighting and combining is performed within the RF domain and the balance at baseband.

The transmitter 510 in FIG. 5 is composed of $n_T$ transmitting antenna elements 524, each of which conveys a weighted version of the same data sub-stream and uses the OFDM modulation. In other words, the stream of $N_t$ consecutive QAM-modulated data symbols denoted by $\{s_{1,0}, 9 \; s_{1,1}, \ldots, s_{1,N_t-1}\}$ is weighted at each transmit antenna element 524 and modulated onto a set of $N_t$ orthogonal subcarriers.

The transmit signal at tone k out of antenna j is $$txs_{j,k} = v_{j,k} \cdot s_{1,k} \quad (28.)$$

The transmit vector at tone k is $$\underline{txs}_k = \underline{v}_k \cdot s_{1,k} \quad (29.)$$

Therefore the transmit weights 528 can be viewed as a $n_T \times N_t$ matrix, which preferably is a function of the propagation channel 530. This, however, requires the transmitter 510 to be aware of the characteristics of the channel 530.

In order to keep the total transmit power P constant regardless of the number of transmit antenna elements 524, we assume that each of the digital symbols transmitted out of each transmitter antenna element 524 has a power $P/n_T$, i.e., $$E[s_{1,k} s_{1,k}^*] = P/n_T = \sigma_s^2 \quad (30.)$$

The total transmit power based on (29) is $$TXPW = E[s_{1,k}^* \underline{v}_k^H \underline{v}_k s_{1,k}] = \underline{v}_k^H \underline{v}_k E[s_{1,k} s_{1,k}^*] = \underline{v}_k^H \underline{v}_k P/n_T \quad (31.)$$

Since we want to constrain the total transmit power to P such that $$TXPW = P \quad (32.)$$

then the constraint on the transmit weight is expressed as $$\text{trace}(\underline{v}_k \underline{v}_k^H) = \underline{v}_k^H \underline{v}_k = \|\underline{v}_k\|^2 = n_T \quad (33.)$$

At the receiver 520, the signal received at each antenna element 540 is demodulated and down-converted from RF to baseband within RF chain 542. Then the cyclic prefix (CP), which was added 544 at the transmitter 510 to mitigate ISI, is removed 546. The symbols, via a serial-to-parallel conversion 550, are then mapped to the subcarriers of a 64-point FFT 554.

In a noise-limited scenario, the reconstructed data signal at the output of the FFT 554 of the $i^{th}$ receive antenna element 540 for the $k^{th}$ tone is given by $$r_{i,k} = s_{1,k} \sum_{j=1}^{nT} H_{i,j}\left(e^{j\frac{2\pi}{N_t}k}\right) \cdot v_{j,k} + n_{i,k} \quad (34.)$$

where $H_{i,j}$ is the channel frequency response of the L-tap channel impulse response denoted by $\{h_{i,j,0}, h_{i,j,1}, \ldots, h_{i,j,L-1}\}$ corresponding to transmit and receive antenna elements j and i, respectively, and where n is complex-valued additive white Gaussian noise (AWGN) with zero-mean and variance $\sigma^2$. The received signals are collected from each antenna element in an M-dimensional vector. The received vector at tone k becomes:

$$\underline{r}_k = H_k \underline{v}_k \cdot s_{1,k} + \underline{n}_k \quad (35.)$$

where $$H_k = \begin{bmatrix} H_{1,1}\left(e^{j\frac{2\pi}{N_t}k}\right), & \ldots, & H_{1,n_T}\left(e^{j\frac{2\pi}{N_t}k}\right) \\ & \vdots & \\ H_{M,1}\left(e^{j\frac{2\pi}{N_t}k}\right), & \ldots, & H_{M,n_T}\left(e^{j\frac{2\pi}{N_t}k}\right) \end{bmatrix}$$

is a $M \times n_T$ matrix.

The received vector is multiplied at each tone by the complex conjugate of a M×1 vector denoted by $\underline{u}_k$. The resulting output at tone k is given by $$y_k = \hat{s}_{1,k} = \underline{u}_k^H \cdot \underline{r}_k = \underline{u}_k^H H_k \underline{v}_k \cdot s_{1,k} + \underline{u}_k^H \underline{n}_k \quad (36.)$$

where $y_k$ is the estimate of $s_{1,k}$.

The singular value decomposition (SVD) is an attractive technique for solving the joint optimization of the transmit and receive weights 528, 560, as shown in J. B. Andersen, "Antenna arrays in mobile communications: gain, diversity, and channel capacity," IEEE Ant. prop. Mag., 12-16, April 2000. An SVD expansion is a description of $H_k$, as given by $$\underline{H}_k = U_k S_k V_k^H \quad (37.)$$

where $S_k$ is a diagonal matrix of real, non-negative singular values, which are the square roots of the eigenvalues of $G_k = H_k^H H_k$. Thus, $$\underline{u}_k^H H_k \underline{v}_k = \sqrt{\lambda_{max,k}} \quad (38.)$$

The solution for the transmitter and receiver weights 528, 560 are given directly from the right and left singular vectors of $H_k$ corresponding to the largest singular value. Note again that the transmit weights 528 are normalized according to (33) such that:

$$\underline{u}_k^H H_k \underline{v}_k = \sqrt{\lambda_{max,k}} \cdot \sqrt{n_T} \quad (39.)$$

The corresponding maximum output SNR is then $$SNR_{max,k} = \frac{(\underline{u}_k^H H_k \cdot \underline{v}_k)^2 E[s_{1,k} s_{1,k}^*]}{\sigma^2 \|u_k\|^2} = \frac{\lambda_{max,k} n_T P/n_T}{\sigma^2} \quad (40.)$$

$$SNR_{max,k} = \frac{P\lambda_{max,k}}{\sigma^2} \quad (41.)$$

The computation of the metric weighting used in Viterbi decoding proceeds as follows:

The error signal at tone k is expressed as:

$$e(k) = s_{1,k} - y_k \quad (42.)$$

Assuming that $\underline{u}_k$ may be normalized by $\sqrt{\lambda_{max,k}} \cdot \sqrt{n_T}$, we rewrite (36) as $$y_k = s_{1,k} + \frac{u_k^H}{\sqrt{n_T \lambda_{max,k}}} n_k \quad (43.)$$

The MSE—or post-combining noise variance—is thus $$\Sigma_{H,k} = E|e(k)|^2 = (s_{1,k} - y_k) \cdot (s_{1,k}^* - y_k^*) \quad (44.)$$

$$\Sigma_{H,k} = \frac{\sigma^2 u_k^H u_k}{n_T \lambda_{max,k}} = \frac{\sigma^2}{n_T \lambda_{max,k}} \quad (45.)$$

where the fact that singular vectors have norm unity has been used.

Since $\sigma^2/n_T$ is constant over the frequency bandwidth, it does not need to be taken into account in the metric. The metrics weighting (MW) are thus equal to $$MW(k) = \lambda_{max,k} \quad (46.)$$

Each bit comprising the symbol $y_k$ is weighted by MW(k).

In summary, the implementation of the case of FIG. 5 involves computation, based on the knowledge of the channel frequency response at each tone, of a different transmit and receive weight at each tone such that the output SNR is maximized at the tone.

Next, a case is described with reference to FIG. 6 in which the spatial transmitted and received signals are combined in the RF domain. This permits use of an architecture containing only a single RF chain, which facilitates economical implementation of user equipment.

Figure 6:
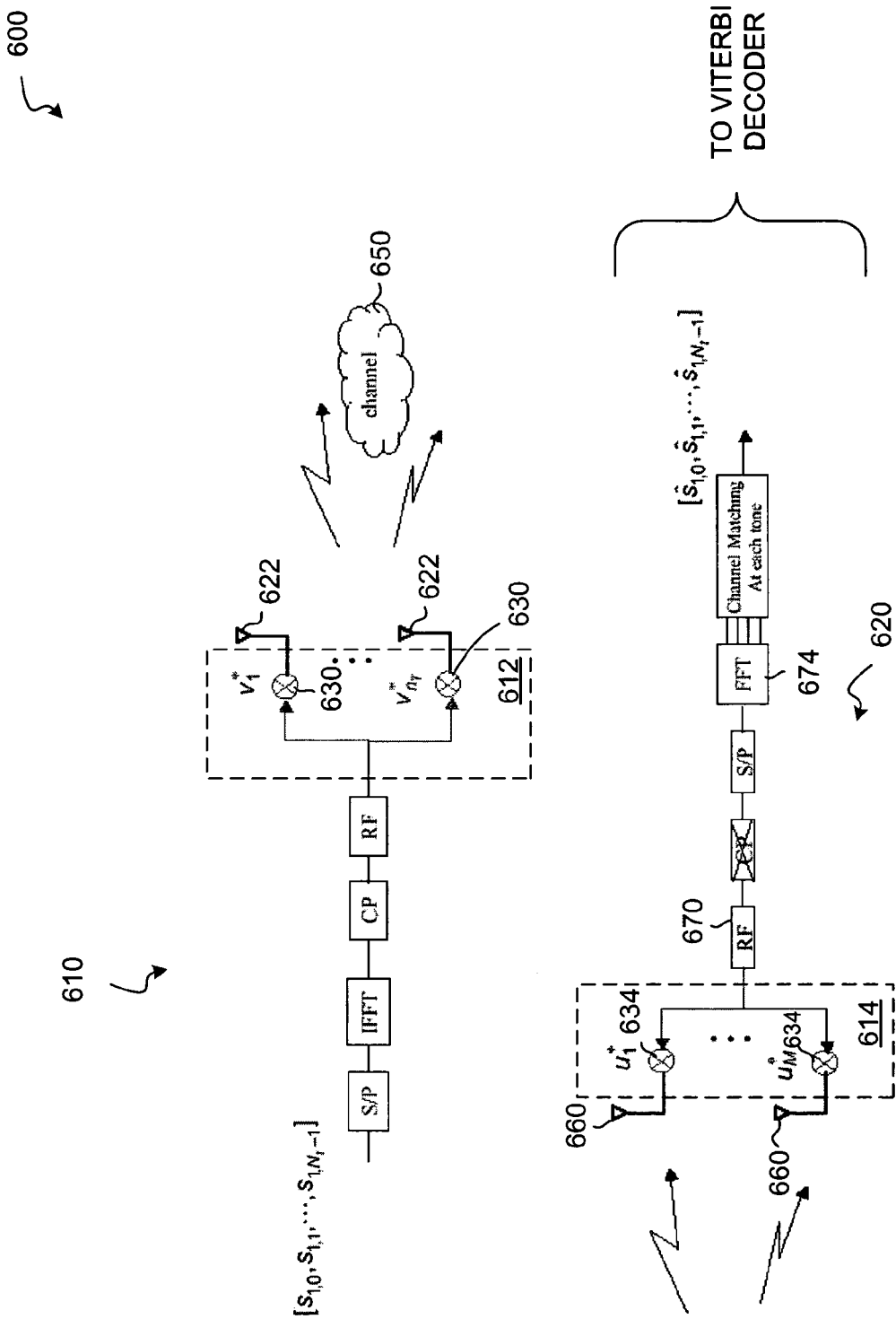
FIG. 6 illustratively represents the transmitter and receiver structure of a SC-MIMO-OFDM system utilizing an RF weighting and combining arrangement.

FIG. 6 illustratively represents a transmitter 610 and a receiver 620 of a SC-MIMO-OFDM system 600 utilizing RF weighting and combining arrangements 612 and 614, respectively. The transmitter 610 of the system 600 is composed of $n_T$ transmit antenna elements 622, each of which conveys a weighted version of the same data sub-stream and uses OFDM modulation. However, in contrast to the case of FIG. 5, the combining weights 630 in the present exemplary case are implemented using RF-based elements capable of being defined by a single vector. This advantageously permits the number of RF transmit chains to be reduced to one. At the receiver 620, the combining weights 634 are also implemented at RF as a single vector, and the combined received signal is then passed through a single RF chain for demodulation.

In alternate implementations the RF-based weighting and combining arrangements 612, 614 within the transmitter 610 and receiver 620 of FIG. 6 may be complemented by baseband weighting and combining arrangements. This results in a portion of the requisite weighting and combining being performed in the RF domain and the balance being effected at baseband.

In the configuration of FIG. 6, the transmit signal at tone k out of antenna j is $$txs_{j,k} = v_j \cdot s_{1,k} \quad (47.)$$

The transmit vector at tone k is $$\underline{txs}_k = \underline{v} \cdot s_{1,k} \quad (48.)$$

The transmit weights can thus be viewed as an $n_T \times 1$ vector, which preferably is a function of the propagation channel 650. However, it is no longer a function of the channel frequency selectivity, as it is common to all tones. As the total transmit power is kept equal to P, it follows that:

$$E[s_{1,k} s_{1,k}^*] = P/n_T = \sigma_s^2 \quad (49.)$$

Then the constraint on the transmit weight 630 is expressed as $$\text{trace}(\underline{v}\underline{v}^H) = \underline{v}^H \underline{v} = \|\underline{v}\|^2 = n_T \quad (50.)$$

The signal propagates through the channel 650, and the received signals from each antenna element 660 of the receiver 620 are collected in an M-dimensional vector. The received vector at tone k becomes:

$$\underline{r}_k = H_k \underline{v} \cdot s_{1,k} + \underline{n}_k \quad (51.)$$

The received vector is multiplied at RF by an M×1 receive weight vector denoted by u and physically realized by weighting elements 634. It is then passed through an RF chain 670 for demodulation and downconversion. The combined received signal at the output of the FFT 674 can thus be written as:

$$y_k = \hat{s}_{1,k} = \underline{u}^H \cdot \underline{r}_k = \underline{u}^H H_k \underline{v} \cdot s_{1,k} + \underline{u}^H \underline{n}_k \quad (52.)$$

where $y_k$ is the estimate of $s_{1,k}$.

The corresponding output SNR at tone k is:

$$SNR_k = \frac{(\underline{u}^H H_k \cdot \underline{v})^2 E[s_{1,k} s_{1,k}^*]}{\sigma^2 \|\underline{u}\|^2} = \frac{(\underline{u}^H H_k \cdot \underline{v})^2 P/n_T}{\sigma^2 \|\underline{u}\|^2} \quad (53.)$$

The mean SNR over frequency is expressed as $$\overline{SNR} = \frac{1}{N_t} \sum_{k=0}^{N_t-1} SNR_k = \frac{P/n_T}{N_t \sigma^2 \|\underline{u}\|^2} \sum_{k=0}^{N_t-1} (\underline{u}^H H_k \cdot \underline{v})^2 \quad (54.)$$

or equivalently $$\overline{SNR} = \frac{P/n_T}{N_t \sigma^2 \|\underline{u}\|^2} \sum_{k=0}^{N_t-1} \underline{u}^H H_k \underline{v}\underline{v}^H H_k^H \underline{u} \quad (55.)$$

For a given vector $\underline{v}$, $\underline{u}$ is designed such that the following sum is maximized:

$$\frac{\underline{u}^H \left( \sum_{k=0}^{N_t-1} H_k \underline{v}\underline{v}^H H_k^H \right) \underline{u}}{\underline{u}^H \underline{u}} \quad (56.)$$

The solution for $\underline{u}$ that maximizes the quantity in (56) is the eigenvector of the matrix $$\left( \sum_{k=0}^{N_t-1} H_k \underline{v}\underline{v}^H H_k^H \right)$$

corresponding to the largest eigenvalue. The solution is formulated as:

$$\underline{u} = eig\left( \lambda_{max}, \sum_{k=0}^{N-1} H_k \underline{v}\underline{v}^H H_k^H \right) \quad (57.)$$

For a given vector $\underline{u}$, $\underline{v}$ is designed such that the following sum is maximized:

$$\frac{\underline{v}^H \left( \sum_{k=0}^{N_t-1} H_k^H \underline{u}\underline{u}^H H_k \right) \underline{v}}{\underline{v}^H \underline{v}} \quad (58.)$$

The solution for $\underline{v}$ that maximizes the quantity in (58) is the eigenvector of the matrix $$\left( \sum_{k=0}^{N_t-1} H_k^H \underline{u}\underline{u}^H H_k \right)$$

corresponding to the largest eigenvalue. The solution may be formulated as:

$$\underline{v} = eig\left(\lambda_{max}, \sum_{k=0}^{N_t-1} H_k^H \underline{u}\underline{u}^H H_k\right) \quad (59.)$$

The solution for $\underline{v}$ depends on $\underline{u}$ and vice-versa, and thus becomes a joint problem capable of being solved by, for example, a numerical search.

The computation of the metric weighting utilized in Viterbi decoding proceeds as follows:

The error signal at tone k is expressed as:

$$e(k) = s_{1,k} - y_k \quad (60.)$$

Assuming that $\underline{u}$ may be normalized at each tone by $(\underline{u}^H H_k \cdot \underline{v})^*$, equation (52) is rewritten as $$y_k = s_{1,k} + \frac{\underline{u}^H}{\underline{u}^H H_k \cdot \underline{v}} \underline{n}_k \quad (61.)$$

The MSE—or post-combining noise variance—is thus $$\sum_{H,k} = E|e(k)|^2 = (s_{1,k} - y_k) \cdot (s_{1,k}^* - y_k^*) \quad (62.)$$

$$\sum_{H,k} = \frac{\sigma^2 \underline{u}^H \underline{u}}{(\underline{u}^H H_k \cdot \underline{v})^2} \quad (63.)$$

Since $\sigma^2 \underline{u}^H \underline{u}$ is constant over the frequency bandwidth, it does not need to be taken into account in the metric. The metrics weighting (MW) are thus equal to $$MW(k) = (\underline{u}^H H_k \underline{v})^2 \quad (64.)$$

Each bit comprising the symbol $y_k$ is weighted by MW(k).

Figure 7:
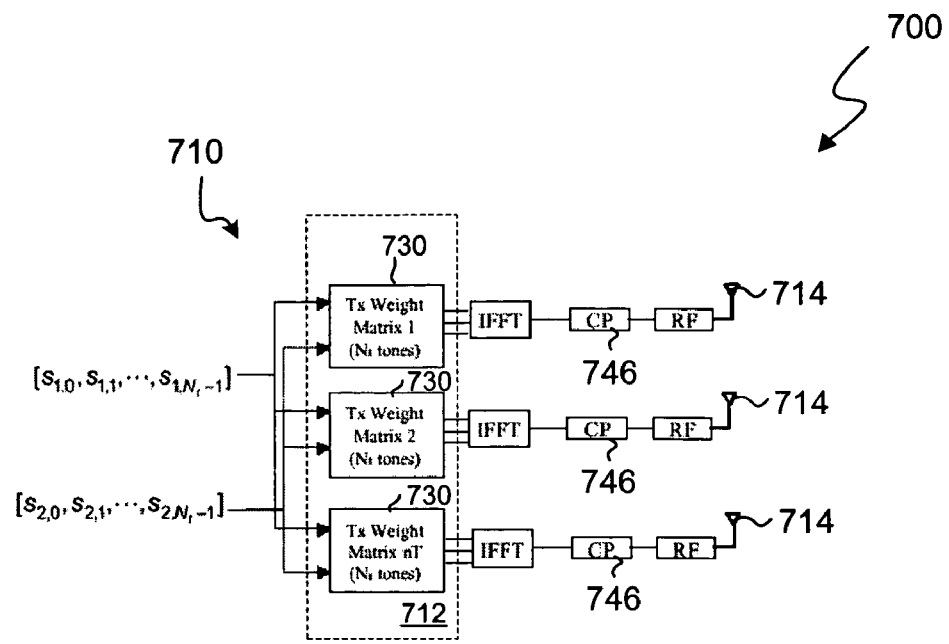
FIG. 7 depicts the transmitter and receiver structure of a spatially-multiplexed (SM)-MIMO-OFDM system incorporating baseband combining arrangements.
Figure 7:
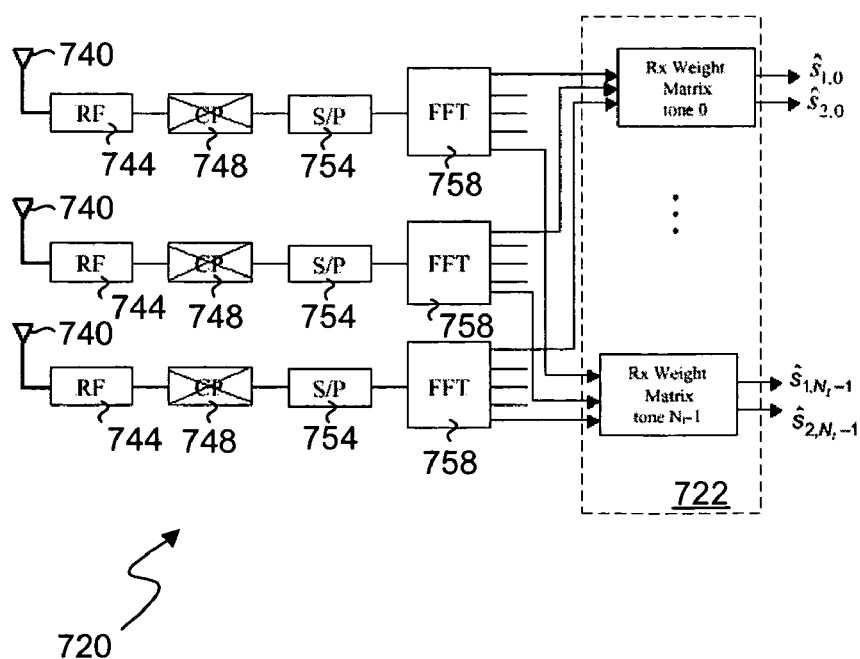

FIG. 7 depicts the transmitter 710 and receiver 720 of a spatially-multiplexed MIMO-OFDM system 700. As shown, the transmitter 710 and receiver respectively incorporate Tx and Rx baseband weighting and combining arrangements 712, 722. Consistent with the invention, these baseband weighting and combining arrangements may be incorporated within spatially-multiplexed MIMO-OFDM transmitter and receiver structures together with RF-based weighting and combining arrangements (see, e.g., FIG. 8 and the accompanying discussion). In this way a portion of the requisite weighting and combining is performed within the RF domain and the balance at baseband.

The transmitter 710 is composed of $n_T$ transmitting antenna elements 714, each of which conveys a weighted combination of N distinct sub-streams (i.e. spatially-multiplexed signals) and uses OFDM modulation, where a stream of $N_t$ consecutive QAM-modulated data symbols, denoted by $\{s_{i,o}, s_{i,1}, \ldots, s_{i,N_t-1}\}$, i=1, ..., N is modulated onto a set of $N_t$ orthogonal subcarriers.

In the system 700, the transmit signal at tone k out of the $j^{th}$ antenna element is $$txs_{j,k} = \sum_{i=1}^{N} v_{j,i,k} \cdot s_{i,k} \quad (65.)$$

The transmit vector at tone k is $$\underline{txs}_k = V_k \cdot \underline{s}_k = \sum_{i=1}^{N} \underline{v}_{i,k} \cdot s_{i,k} \quad (66.)$$

where $V_k$ is the transmit weight matrix at tone k of size $n_T \times N$.

The total transmit power based on (66) is $$TXPW = \sum_{i=1}^{N} E[s_{i,k}^* \underline{v}_{i,k}^H \underline{v}_{i,k} s_{i,k}] \quad (67.)$$

$$= \sum_{i=1}^{N} \underline{v}_{i,k}^H \underline{v}_{i,k} E[s_{i,k} s_{i,k}^*]$$

$$= P/n_T \sum_{i=1}^{N} \underline{v}_{i,k}^H \underline{v}_{i,k}$$

where $$E[s_{i,k} s_{i,k}^*] = P/n_T = \sigma_s^2, i=1, \ldots, N \quad (68.)$$

Since it is desired to constrain the total transmit power to P such that $$TXPW = P \quad (69.)$$

then the constraint on the transmit weight 730 is expressed as $$\operatorname{trace}(V_k^H V_k) = \sum_{i=1}^{N} \underline{v}_{i,k}^H \underline{v}_{i,k} = n_T \quad (70.)$$

In order to simplify the example, a case is presented in which the number $(n_T)$ of transmit antenna elements 714 is equal to the number of spatially-multiplexed signals N. To simplify further, the weight matrix $V_k$ at each tone is made equal to the identity matrix. Under these conditions the transmit vector at tone k simplifies to:

$$\underline{txs}_k = \underline{s}_k \quad (71.)$$

It is to be understood that in other embodiments, $n_T$ can be made larger than N and/or the weight matrix $V_k$ can be a matrix other than the identity matrix. For example, when $V_k$ is dependent upon the channel, various "precoding" methods can assist in the computation of $V_k$ given a specific criterion to optimize.

At the receiver 720, the signal received at each antenna element 740 is demodulated and down-converted from RF to baseband within an RF chain 744. Then the cyclic prefix (CP), which was added (746) at the transmitter 710 to mitigate ISI, is removed (748). The symbols, via a serial-to-parallel conversion 754, are then mapped to the subcarriers of a 64-point FFT 758.

In a noise-limited scenario with $N=n_T=2$, the reconstructed data signal at the output of the FFT 758 of the $i^{th}$ receive antenna element 740 for the $k^{th}$ tone is given by $$r_{i,k} = H_{i,1}\left(e^{j\frac{2\pi}{N_T}k}\right) \cdot s_{1,k} + H_{i,2}\left(e^{j\frac{2\pi}{N_T}k}\right) \cdot s_{2,k} + n_{i,k} \quad (72.)$$

The received signals from each antenna element 740 are collected in an M-dimensional vector. The received vector at tone k becomes:

$$\underline{r}_k = H_k \cdot \underline{s}_k + \underline{n}_k \quad (73.)$$

In this case the received vector is multiplied at each tone by the complex conjugate of an M×N matrix denoted by $W_k$. The resulting output at tone k is given by $$\underline{y}_k = W_k^H \cdot \underline{r}_k = W_k^H H_k \cdot \underline{s}_k + W_k^H \underline{n}_k \quad (74.)$$

where $\underline{y}_k = [y_{1,k}, \ldots, y_{N,k}]^T$ and $\underline{s}_k = [s_{1,k}, \ldots, s_{N,k}]^T$ are an N-dimensional vectors. The matrix $W_k$ can be expressed as $W_k = [\underline{w}_{k,1}, \ldots, \underline{w}_{k,N}]$.

The solution for $W_k$ is given by the well-known minimum mean squared error (MMSE) solution (i.e. Wiener-Hopf solution), see, e.g., S. Haykin, Adaptive Filter Theory, $3^{rd}$ Ed., Prentice Hall, 1996. The general solution is given by:

$$W_k = (H_k R_{s,k} H_k^H + R_{n,k})^{-1} H_k R_{s,k} \quad (75.)$$

where $R_{s,k} = E[\underline{s}_k \underline{s}_k^H]$ and $R_{n,k} = E[\underline{n}_k \underline{n}_k^H]$.

Assuming that $R_s = \sigma_s^2 I_N$ and $R_n = \sigma^2 I_M$, the solution simplifies to:

$$W_k = \left(H_k H_k^H + \frac{\sigma^2}{\sigma_s^2} I_M\right)^{-1} H_k \quad (76.)$$

or equivalently, $$W_k^H = \left(H_k^H H_k + \frac{\sigma^2}{\sigma_s^2} I_N\right)^{-1} H_k^H \quad (77.)$$

The computation of the metric weighting used in Viterbi decoding proceeds as follows:

The error signal j at tone k is expressed as:

$$e_j(k) = s_{j,k} - \underline{w}_{k,j}^H \cdot \underline{r}_k \quad (78.)$$

The MSE—or post-combining noise variance—is thus $$\Sigma_{H,j,k} = E|e_j(k)|^2 = (s_{j,k} - \underline{w}_{k,j}^H \cdot \underline{r}_k) \cdot (s_{j,k}^* - \underline{r}_k^H \underline{w}_{k,j}) \quad (79.)$$

$$\Sigma_{H,j,k} = \sigma_s^2 (1 - \underline{H}_{k,j}^H \cdot \underline{w}_{k,j} - \underline{w}_{k,j}^H \cdot \underline{H}_{k,j} + \underline{w}_{k,j}^H \cdot H_k H_k^H \cdot \underline{w}_{k,j}) + \sigma^2 \underline{w}_{k,j}^H \underline{w}_{k,j} \quad (80.)$$

where $$\underline{H}_{k,j} = \begin{bmatrix} H_{1,j}\left(e^{j\frac{2\pi}{N_t}k}\right) \\ \vdots \\ H_{M,j}\left(e^{j\frac{2\pi}{N_t}k}\right) \end{bmatrix}$$

The metrics weighting (MW) for signal j denoted by $MW_j(k)$ are equal to the inverse of $\Sigma_{H,j,k}$.

$$MW_j(k) = 1/\Sigma_{H,j,k} \quad (81.)$$

Each bit comprising the symbol $s_{j,k}$ is weighted by $MW_j(k)$.

In summary, in the case of FIG. 7 a different weight is computed at each tone based on knowledge of the channel frequency response at each tone, thereby maximizing the output SNR at each tone.

Figure 8:
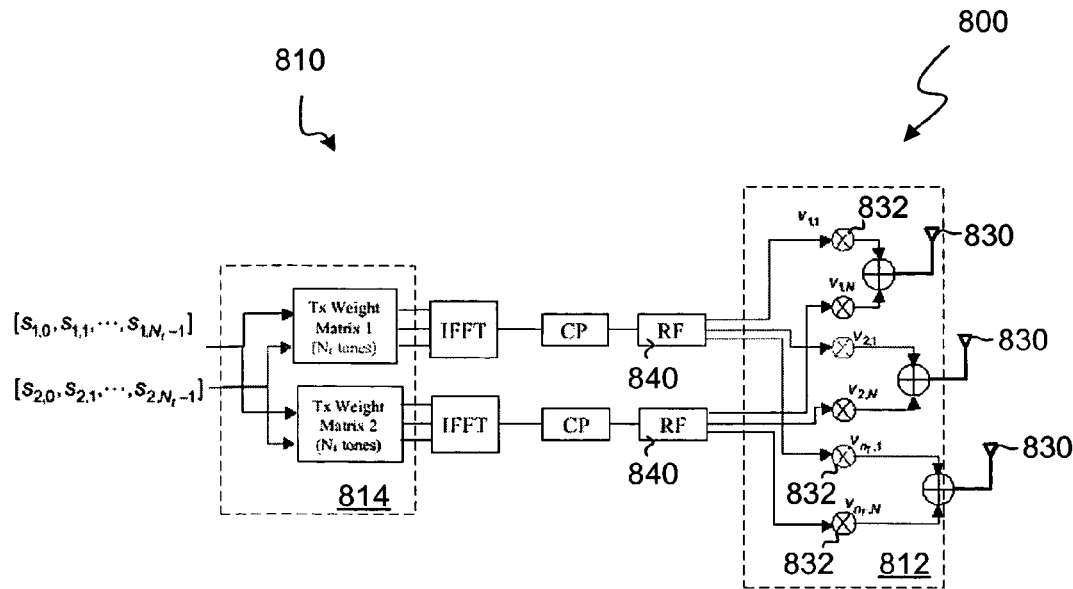
FIG. 8 illustratively represents a transmitter and a receiver structure of a SM-MIMO-OFDM system which each include both RF-based and baseband weighting and combining arrangements.
Figure 8:
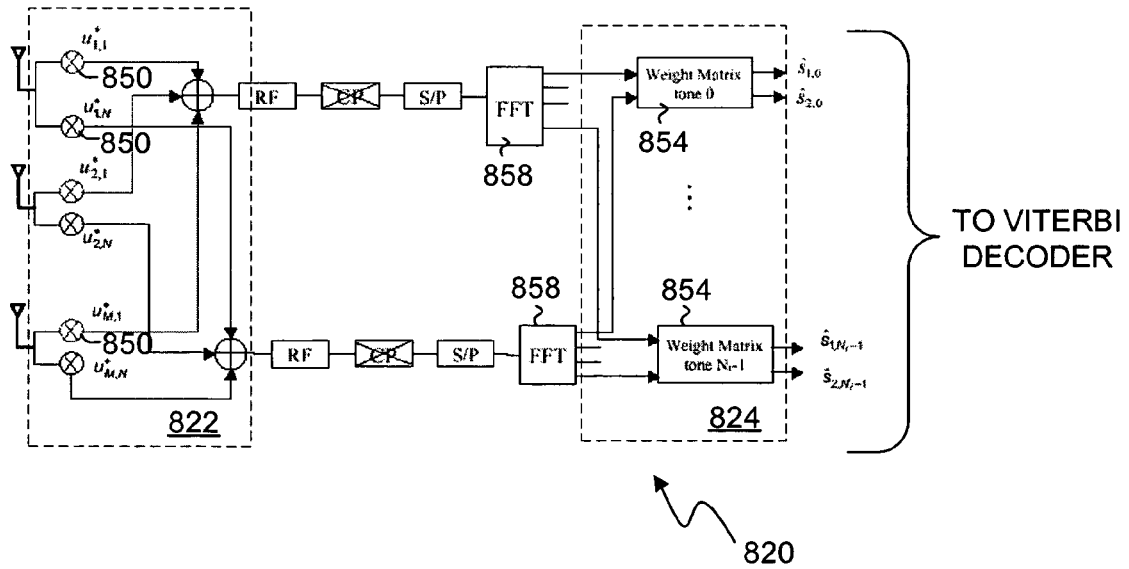

FIG. 8 illustratively represents a communication system 800 including a transmitter 810 and a receiver 820, each of which includes both RF-based and baseband weighting and combining arrangements. Specifically, the transmitter 810 includes an RF weighting and combining arrangement 812 and a baseband weighting and combining arrangement 814, and the receiver 820 includes an RF weighting and combining arrangement 822 and a baseband weighting and combining arrangement 824. As shown, the transmitter 810 is composed of $n_T$ transmit antenna elements 830, each of which conveys a weighted combination of N distinct sub-streams (i.e. spatially-multiplexed signals) and uses OFDM modulation. Since at least a portion of the combining weights are realized as RF elements 832 within the transmitter 810, the number of transmit RF chains 840 is advantageously reduced to the number of spatially-multiplexed signals. This type of an arrangement is believed to permit cost-effective implementation.

In the configuration of FIG. 8, the transmit signal at tone k from the $j^{th}$ antenna 830 is:

$$txs_{j,k} = \sum_{i=1}^{N} v_{j,i} \cdot s'_{i,k} \quad (82.)$$

where $$s'_{i,k} = \sum_{l=1}^{N} v'_{i,l,k} \cdot s_{l,k} \quad (83.)$$

and where the terms v and v' represent the RF and baseband weights, respectively. The transmit vector at tone k is $$\underline{txs}_k = V \cdot V_k' \cdot \underline{s}_k \quad (84.)$$

where V is the transmit RF weight matrix of size $n_T \times N$ and is independent of the index k (as it is constant over the frequency tones), and where $V_k'$ is the transmit baseband weight matrix of size N×N and is dependent upon on the index k (as it is a function of frequency).

In order to simplify the above example, we consider that $V_k'$ is equal to the identity matrix at each tone. It is to be understood that in other embodiments, $V_k'$ can be a matrix other than the identity matrix. For example, when $V_k'$ is dependent upon the channel, various "precoding" methods and the like can assist in the computation of $V_k'$ given a specific criterion to optimize. In this case, the transmit vector at tone k becomes $$\underline{txs}_k = V \cdot \underline{s}_k = \sum_{i=1}^{N} \underline{v}_i \cdot s_{i,k}$$

To preserve the total transmit power, the constraint on the matrix V is written as:

$$\text{trace}(V^H V) = n_T \quad (85.)$$

assuming that $$\sigma_s^2 = E[s_{i,k} s_{i,k}^*] = P/n_T, \, i=1, \ldots, N$$

As mentioned above, the receiver 820 of FIG. 8 also utilizes distinct RF and baseband weighting and combining arrangements. Specifically, a first set of weights 850 for the RF-based arrangement 822 are implemented at RF and are common to all tones, while a second set of weights 854 are utilized within the baseband arrangement 824. Note that the step of computing the RF weights 850 may also be carried out in baseband, in which case the values of the weights 850 are fed back to the RF domain via an internal bus, creating a feedback delay.

In this configuration, the output at the FFT 858 at tone k for the $i^{th}$ receive chain is given by $$r_{i,k} = \underline{u}_i^H H_k \cdot V \cdot \underline{s}_k + \underline{u}_i^H \underline{n}_k \quad (86.)$$

$$r_{i,k} = \underline{u}_i^H H_k \cdot \underline{v}_i \cdot s_{i,k} + \underline{u}_i^H \left( \sum_{j \neq i}^N H_k \cdot \underline{v}_j \cdot s_{j,k} + \underline{n}_k \right) \quad (87.)$$

where $\underline{u}_i = [u_{1,i}, \ldots, u_{M,i}]^T$. The received signals are collected from each receive chain in a N-dimensional vector. At tone k, this received signal vector $\underline{r}_k$ becomes of dimension N×1 and may be expressed as:

$$\underline{r}_k = U^H(H_k \cdot V \cdot \underline{s}_k + \underline{n}_k) = U^H H_k \cdot V \cdot \underline{s}_k + U^H \underline{n}_k \quad (88.)$$

where $U = [\underline{u}_1, \ldots, \underline{u}_N]$ is an M×N matrix containing the set of weights implemented at RF. Expression (88) can also be written as:

$$\underline{r}_k = H_k^n \cdot \underline{s}_k + \underline{n}k \quad (89.)$$

where $H_k^n = U^H H_k \cdot V$ and $\underline{n}_k = U^H \underline{n}_k$.

The received signal model defined by equation (87) is composed of N signal, components and a noise component. Since the transmitter 810 broadcasts N spatially-multiplexed signals in parallel and each of these signals have to be detected individually by the receiver 820, each receiver chain considers one spatially-multiplexed signal as the desired signal component while the remaining N−1 spatially-multiplexed signals are considered as interferers. Stating that the $i^{th}$ receive chain considers the $i^{th}$ spatially-multiplexed signal as the desired signal component, equation (87) is rewritten as $$r_{i,k} = \underline{u}_i^H H_k \underline{v}_i \cdot s_{i,k} + \underline{u}_i^H \underline{\mu}_{i,k} \quad (90.)$$

where μ is considered as the noise plus interference signal.

In this embodiment, the RF weight vectors $\underline{u}_i$ and $\underline{v}_i$ are designed to maximize the SNR (while the baseband weights 854 cancel the interference created by the multiple spatially-multiplexed signals). The SNR associated with the $k^{th}$ tone of the $i^{th}$ receive chain is expressed as $$SNR_{i,k} = \sigma_s^2 \frac{\underline{u}_i^H H_k \cdot \underline{v}_i \cdot \underline{v}_i^H H_k^H \underline{u}_i}{\sigma^2 \underline{u}_i^H \underline{u}_i} \quad (91.)$$

The aggregate SNR across all k tones of the $i^{th}$ receive chain is then $$\overline{SNR}_i = \sum_{k=0}^{N_t-1} SNR_{i,k} = \sigma_s^2 \frac{\underline{u}_i^H \left( \sum_{k=0}^{N_t-1} H_k \cdot \underline{v}_i \cdot \underline{v}_i^H H_k^H \right) \underline{u}_i}{\sigma^2 \underline{u}_i^H \underline{u}_i} \quad (92.)$$

which can be alternatively written as:

$$\overline{SNR}_i = \sigma_s^2 \frac{\underline{v}_i^H \left( \sum_{k=0}^{N_t-1} H_k^H \cdot \underline{u}_i \cdot \underline{u}_i^H H_k \right) \underline{v}_i}{\sigma^2 \underline{u}_i^H \underline{u}_i} \quad (93.)$$

Solving equations (92) and (93) for $\underline{u}_i$ and $\underline{v}_i$ for i=1, ..., N, is a joint problem, which is capable of being solved by, for example, using a numerical search. The solution for $\underline{u}_i$ which maximizes $\overline{SNR}_i$ for a given $\underline{v}_i$ is given by the eigenvector of the matrix $$\left( \sum_{k=0}^{N_t-1} H_k \cdot \underline{v}_i \cdot \underline{v}_i^H H_k^H \right)$$

corresponding to the largest eigenvalue. The solution may be formulated as:

$$\underline{u}_i = eig\left( \lambda_{max}, \sum_{k=0}^{N_t-1} H_k \cdot \underline{v}_i \cdot \underline{v}_i^H H_k^H \right), \quad i = 1, \ldots, N \quad (94.)$$

Meanwhile, the solution for $\underline{v}_i$ which maximizes $\overline{SNR}_i$ for a given $\underline{u}_i$ is given by the eigenvector of the matrix $$\left( \sum_{k=0}^{N_t-1} H_k^H \cdot \underline{u}_i \cdot \underline{u}_i^H H_k \right)$$

corresponding to the largest eigenvalue. This solution is expressed as:

$$\underline{v}_i = eig\left( \lambda_{max}, \sum_{k=0}^{N_t-1} H_k^H \cdot \underline{u}_i \cdot \underline{u}_i^H H_k \right), \quad i = 1, \ldots, N \quad (95.)$$

The received vector is then multiplied at each tone by the complex conjugate of an N×N matrix denoted by $W_k$ so as to enable detection of the transmitted signals. The resulting output signal at tone k is given by $$\underline{y}_k = W_k^H \cdot \underline{r}_k = W_k^H H_k^n \cdot \underline{s}_k + W_k^H \underline{n}_k = W_k^H U^H (H_k \cdot V \cdot \underline{s}_k + \underline{n}_k) \quad (96.)$$

It is observed that while the weights $W_k$ are a function of the applicable frequency tone, the RF weights U and V are common to all tones (and therefore have no dependency on subscript k).

Equation (96) may be solved for $W_k$ using, for example, the well-known minimum mean squared error (MMSE) solution (i.e., the Wiener-Hopf solution). See, e.g., S. Haykin, Adaptive Filter Theory, 3$^{rd}$ Ed., Prentice Hall, 1996. The general solution is given by $$W_k = (H_k'' R_{s,k} H_k''^H + R_{\eta,k})^{-1} H_k'' R_{s,k} \quad (97.)$$

We have $R_{s,k} = \sigma_s^2 I_N$ and $R_{\eta,k} = E[\underline{\eta}_k \underline{\eta}_k^H] = \sigma^2 U^H U$, thus $$W_k = \left(H_k'' H_k''^H + \frac{\sigma^2}{\sigma_s^2} U^H U\right)^{-1} H_k'' \quad (98.)$$

$W_k$ is derived directly from the knowledge of matrices $H_k$, U and V, where U and V are given by equations (94) and (95).

The computation of the metric weighting for use in Viterbi decoding proceeds as follows:

The error signal j at tone k is expressed as:

$$e_j(k) = s_{j,k} - \underline{w}_{k,j}^H \cdot \underline{r}_k \quad (99.)$$

The MSE—or post-combining noise variance—is thus $$\Sigma_{H,j,k} = E|e_j(k)|^2 = (s_{j,k} - \underline{w}_{k,j}^H \cdot \underline{r}_k) \cdot (s_{j,k}^* - \underline{r}_k^H \underline{w}_{k,j}) \quad (100.)$$

The metrics weighting (MW) for signal j denoted by $MW_j(k)$ are equal to the inverse of $\Sigma_{H,j,k}$.

$$MW_j(k) = 1/\Sigma_{H,j,k} \quad (101.)$$

Each bit comprising the symbol $s_{j,k}$ is weighted by $MW_j(k)$.

The above results were illustrated for the case of an OFDM modulation scheme, where frequency-selective fading is expressed in discrete form on each tone. However, for single carrier systems, the propagation channel can be expressed as a continuous function of frequency. In this case the above results can be generalized to an integral over the bandwidth of the signal, rather than the sum of the $N_t$ discrete components over the bandwidth of the channel.

Figure 9:
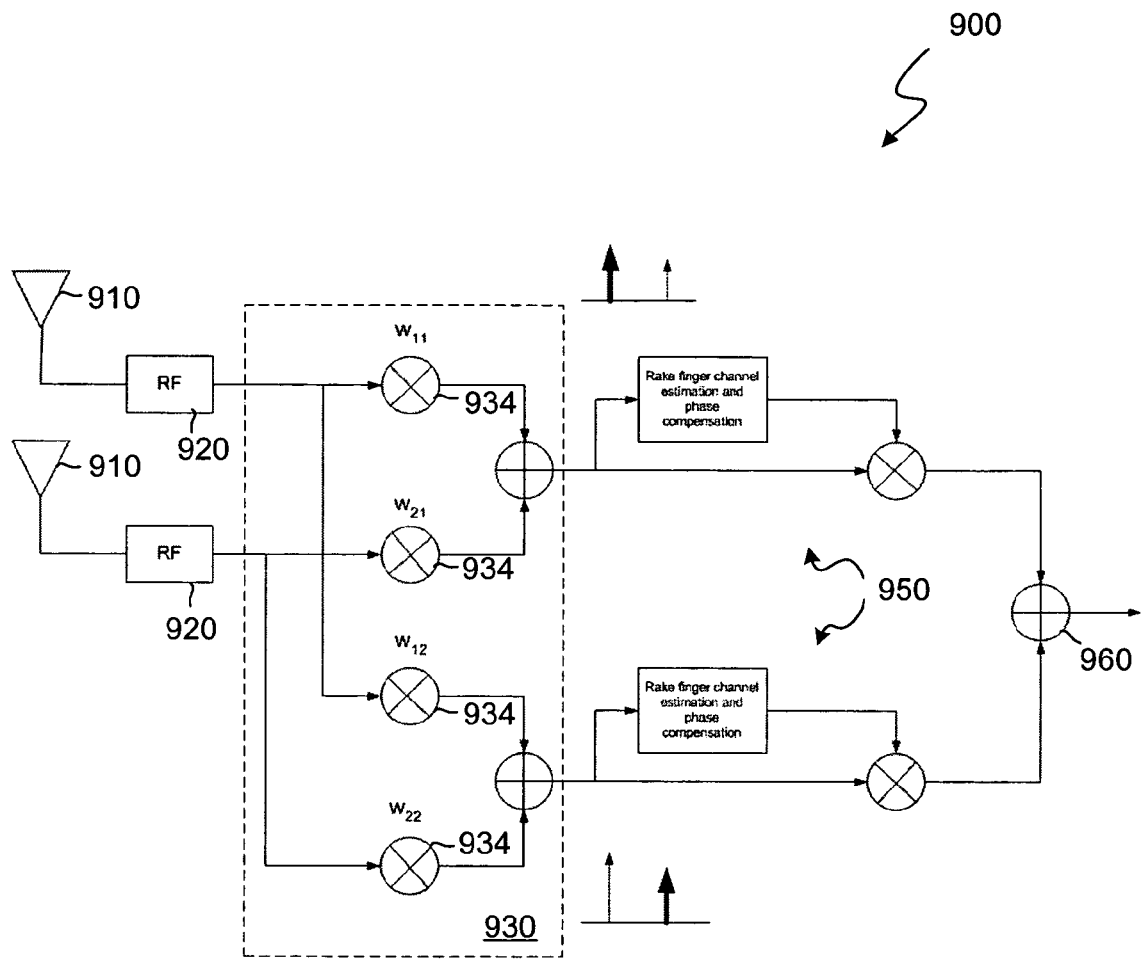
FIG. 9 depicts a space-time direct sequence spread spectrum (DSSS) Rake receiver structure configured with multiple receive antennas and incorporating a baseband weighting and combining arrangement.

Next, a case for a system based on direct sequence spread spectrum processing in the spatial and temporal domains is presented with reference to FIG. 9. This may be considered to extend the space-frequency domain cases described above to the context of space-temporal domain processing.

Turning now to FIG. 9, there is depicted a Rake receiver structure 900 configured with receive antennas 910 and incorporating a baseband weighting and combining arrangement 930. Signals received by the antennas 910 are demodulated and down-converted within RF chains 920. Such a baseband weighting and combining arrangement 930 may be incorporated within Rake receiver structures which also contain RF-based weighting and combining arrangements (see, e.g., FIG. 10 and the accompanying discussion). In this way a portion of the requisite weighting and combining is performed within the RF domain and the balance at baseband.

In the exemplary case of FIG. 9, the values of the baseband weighting elements 934 are computed over the dimensions of both space and time. At the receiver 900, multipath signals received by a set of N receive antennas 910 (i=1 to N) from over a set of M different delay paths (j=1 to M), may be represented as $$r_{ij} = A_{ij} e^{j\phi_{ij}} \cdot x \cdot p + n_{ij} = A_{ij} e^{j\phi_{ij}} \cdot s + n_{ij} \quad (102.)$$

where $A_{ij}$ are the fading signal envelopes, $\phi_{ij}$ are the corresponding phases, x is the transmitted signal (data symbols), p is the spreading sequence, and each $n_{ij}$ is an additive white Gaussian noise (AWGN) component. A corresponding representation in the form of a space-time matrix is given below:

$$R = H \cdot s + N \quad (103.)$$

where $\underline{H}$ represents the N×M channel gain matrix $$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{N1} & \ldots & h_{NM} \end{bmatrix} = [\underline{h}_1 \; \underline{h}_2 \; \ldots \; \underline{h}_M] \quad (104.)$$

At each delay j the signal vector is $$\underline{r}_j = \underline{h}_j \cdot s + \underline{n}_j \quad (105.)$$

In the case of baseband combining, vector $\underline{r}_j$ is multiplied by the complex weight vector $\underline{w}_j^H$ $$y_j = \underline{w}_j^H \underline{r}_j = \underline{w}_j^H \underline{h}_j \cdot s + \underline{w}_j^H \underline{n}_j \quad (106.)$$

The corresponding output SNR, assuming the Gaussian approximation for simplification (i.e., the interference and noise component is uncorrelated and of equal power across receive antennas) is $$SNR_j = \frac{\sigma_s^2}{\sigma^2} \frac{\underline{w}_j^H \underline{h}_j \underline{h}_j^H \underline{w}_j}{\underline{w}_j^H \underline{w}_j} \quad (107.)$$

where $\sigma_s^2 = E[ss^*]$ and $\sigma^2 = E[n_{ij} n_{ij}^*]$.

In a noise-limited scenario, the weight maximizing the output SNR in this case is $$\underline{w}_j = \underline{h}_j \quad (108.)$$

The corresponding SNR (before de-spreading) is $$SNR_j = \frac{\sigma_s^2}{\sigma^2} \frac{\underline{h}_j^H \underline{h}_j \underline{h}_j^H \underline{h}_j}{\underline{h}_j^H \underline{h}_j} = \frac{\sigma_s^2}{\sigma^2} \underline{h}_j^H \underline{h}_j = \frac{\sigma_s^2}{\sigma^2} \sum_{i=1}^{N} |h_{ij}|^2 \quad (109.)$$

This corresponds to the Maximum Ratio Combining (MRC) solution, where the output SNR is the sum of individual SNRs at a particular delay over multiple antenna elements.

Furthermore, each of the M fingers 950 of the Rake receiver separates and de-spreads the signals at a given delay as follows:

$$u_j = y_j \cdot p = \underline{h}_j^H \underline{h}_j \cdot s \cdot p + \underline{h}_j^H \underline{n}_j \cdot p = G \cdot \underline{h}_j^H \underline{h}_j \cdot x + \underline{h}_j^H \underline{n}_j \quad (110.)$$

The corresponding SNR (after de-spreading) is $$SNR_j = G \frac{\sigma_x^2}{\sigma^2} \underline{h}_j^H \underline{h}_j = G \frac{\sigma_x^2}{\sigma^2} \sum_{i=1}^{N} |h_{ij}|^2 \quad (111.)$$

where G is the processing gain and $\sigma_x^2 = E[xx^*]$.

Finally, the Rake combiner 960 optimally combines the output from fingers at different delays in accordance with the MRC metric:

$$SNR_z = \sum_{j=1}^{M} SNR_j = G \frac{\sigma_x^2}{\sigma^2} \sum_{i=1}^{N} \sum_{j=1}^{M} |h_{ij}|^2 \qquad (112.)$$

Figure 10:
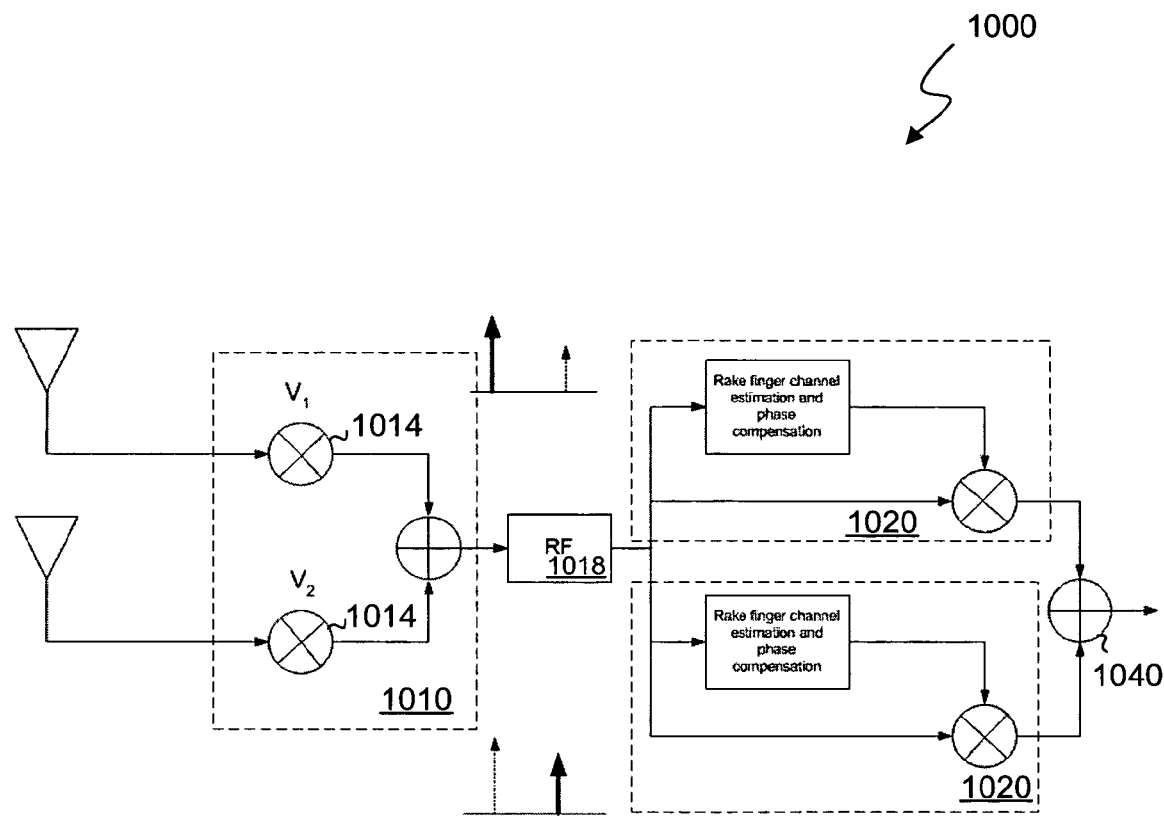
FIG. 10 depicts a space-time direct sequence spread spectrum (DSSS) receiver structure configured with multiple receive antennas and containing an RF weighting and combining arrangement.

FIG. 10 depicts a space-time direct sequence spread spectrum (DSSS) receiver 1000 which contains an RF weighting and combining arrangement 1010. As shown, the RF weighting and combining arrangement 1010 feeds an RF chain 1018, which effects demodulation and down-conversion to baseband. In the exemplary implementation the weighting values 1014 for the combining arrangement 1010 may be expressed as a one-dimensional vector that is applicable to all fingers 1020 of the Rake receiver 1000. The computation step may be carried out in baseband, in which case the values of the weights 1014 are fed back to the RF weighting and combining arrangement 1010 via an internal bus (not shown).

In alternate implementations the RF-based weighting and combining arrangement 1010 within the receiver structure of FIG. 10 may be complemented by a baseband weighting and combining arrangement. This results in a portion of the requisite weighting and combining being performed in the RF domain and the balance being effected at baseband.

As in the baseband-combining case of FIG. 9, at each delay j the signal vector can be represented as $$\underline{r}_j = \underline{h}_j \cdot s + \underline{n}_j \qquad (113.)$$

With smart-antenna combining, vector $\underline{r}_j$ is multiplied by a complex weight vector $\underline{v}^H$ so as to obtain $$y_j = \underline{v}^H \underline{r}_j = \underline{v}^H \underline{h}_j s + \underline{v}^H \underline{n}_j \qquad (114.)$$

The corresponding SNR at each delay j is $$SNR_j = \frac{\sigma_s^2}{\sigma^2} \frac{\underline{v}^H \underline{h}_j \underline{h}_j^H \underline{v}}{\underline{v}^H \underline{v}} \qquad (115.)$$

where $\sigma_s^2 = E[ss^*]$ and $\sigma^2 = E[n_{ij} n_{ij}^*]$. Next the sum of SNRs (where the sum is taken across all RAKE fingers) is maximized:

$$SNR = \sum_{j=1}^{M} SNR_j = \frac{\sigma_s^2}{\sigma^2} \frac{\underline{v}^H HH^H \underline{v}}{\underline{v}^H \underline{v}} \qquad (116.)$$

Equation (116) is recognized as a standard eigenvalue decomposition problem; that is, $$\frac{\underline{v}^H HH^H \underline{v}}{\underline{v}^H \underline{v}} = \lambda_{max} \text{ and} \qquad (117.)$$

$$HH^H \underline{v} = \lambda_{max} \underline{v} \qquad (118.)$$

Accordingly, the SNR maximizing weight vector $\underline{v}$ is the eigenvector corresponding to the strongest eigenvalue of $HH^H$.

It is next demonstrated that the solution for $\underline{v}$ given in Equation (118) effectively maximizes the SNR at the output of the Rake combiner 1040. After de-spreading, the Rake combiner combines the signals at delays captured by Rake fingers 1020, using MRC metrics. Equation (114) may be rewritten to reflect the case of a single delay j $$y_j = \underline{v}^H \underline{r}_j = \underline{v}^H \underline{h}_j \cdot s + \underline{v}^H \underline{n}_j \qquad (119.)$$

We substitute $k_j = \underline{v}^H \underline{h}_j$ and $\eta_j = \underline{v}^H \underline{n}_j$ and obtain $$y_j = \kappa_j \cdot s + \eta_j \text{ and} \qquad (120.)$$

$$SNR_j = \frac{\kappa_j s \cdot s^* \kappa_j^H}{\eta_j \eta_j^H} = \frac{\sigma_s^2}{\sigma_{\eta_j}^2} |\kappa_j|^2 \qquad (121.)$$

Vectors $\underline{y}$, $\underline{\kappa}$ and $\underline{\eta}$ are defined at multiple delays j=1 to M:

$$\underline{y} = \begin{bmatrix} y_1 \\ y_2 \\ \vdots \\ y_M \end{bmatrix}; \underline{\kappa} = \begin{bmatrix} \kappa_1 \\ \kappa_2 \\ \vdots \\ \kappa_M \end{bmatrix}; \underline{\eta} = \begin{bmatrix} \eta_1 \\ \eta_2 \\ \vdots \\ \eta_M \end{bmatrix} \qquad (122.)$$

The Rake receiver 1000 coherently combines elements of $\underline{y}$ in order to obtain $$z = \underline{\xi}^H \underline{y} = \underline{\xi}^H \underline{\kappa} \cdot s + \underline{\xi}^H \underline{\eta} \qquad (123.)$$

The weights are $\underline{\xi} = \underline{\kappa}$, so that $$z = \underline{\kappa}^H \underline{\kappa} \cdot s + \underline{\kappa}^H \underline{\eta} = \sum_{j=1}^{M} |\kappa_j|^2 \cdot s + \underline{\kappa}^H \underline{\eta} \qquad (124.)$$

The corresponding SNR of output z is $$SNR_z = \frac{\sum_{j=1}^{M} |\kappa_j|^2 \cdot s \left( \sum_{j=1}^{M} |\kappa_j|^2 \cdot s \right)^H}{\underline{\kappa}^H \eta \eta^H \underline{\kappa}} \qquad (125.)$$

$$= \frac{\sigma_s^2}{\sigma_\eta^2} \frac{\left( \sum_{j=1}^{M} |\kappa_j|^2 \right)^2}{\sum_{j=1}^{M} |\kappa_j|^2}$$

$$= \frac{\sigma_s^2}{\sigma_\eta^2} \sum_{j=1}^{M} |\kappa_j|^2$$

assuming $\sigma_{\eta_j} = \sigma_\eta$ for all j.

By comparing Equation (121) to Equation (125), it is concluded that:

$$SNR_z = \sum_{j=1}^{M} SNR_j \qquad (126.)$$

and therefore from Equations (115)-(118) we obtain:

$$SNR_z = \sum_{j=1}^{M} SNR_j = \frac{\sigma_s^2}{\sigma^2} \sum_{j=1}^{M} \frac{v^H h_j h_j^H v}{v^H v} = \frac{\sigma_s^2}{\sigma^2} \lambda_{max} \qquad (127.)$$

After de-spreading, the final result may be expressed as:

$$SNR_z = G \frac{\sigma_x^2}{\sigma^2} \lambda_{max} \qquad (128.)$$

The vector weight v has thus been designed such that the quantity $$\sum_{j=1}^{M} SNR_j$$

is maximized. In view of Equation (126), it has also been shown that these weights maximize the SNR at the output of the Rake combiner 1040 (given the constraint that the vector weight v is constant across all fingers).

Figure 11:
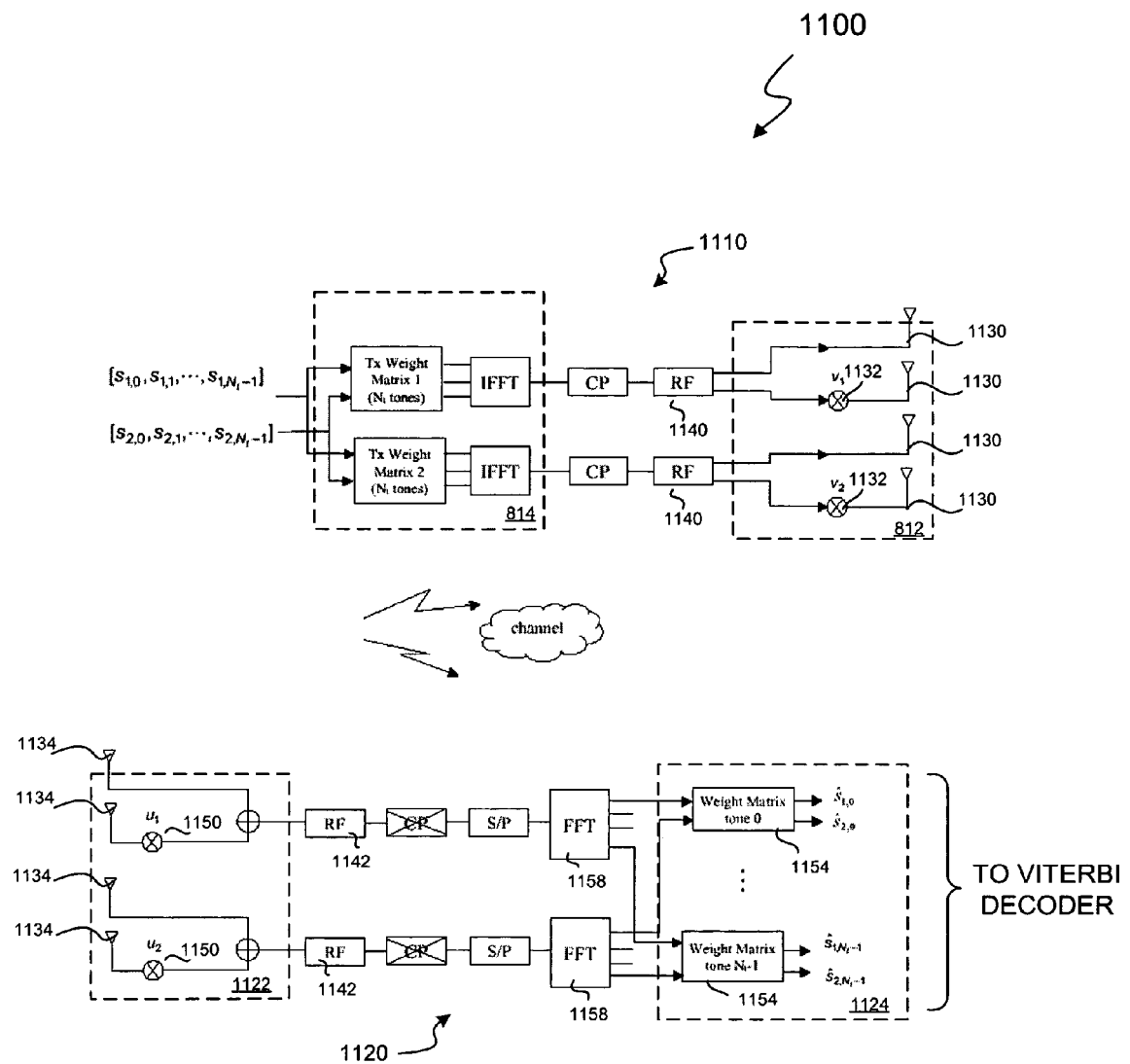
FIG. 11 illustratively represents a transmitter and a receiver structure of a SM-MIMO-OFDM system which each include both a paired single-weight RF-based weighting and combining arrangement and a baseband weighting and combining arrangement.

FIG. 11 illustratively represents a communication system 1100 effectively comprising a simplified version of the communication system 800 represented in FIG. 8. The system 1100 includes a transmitter 1110 and a receiver 1120, each of which includes both RF-based and baseband weighting and combining arrangements. Specifically, the transmitter 1110 includes an RF weighting and combining arrangement 1112 and a baseband weighting and combining arrangement 1114, and the receiver 1120 includes an RF weighting and combining arrangement 1122 and a baseband weighting and combining arrangement 1124. As shown, the transmitter 1110 is composed of $n_T=4$ transmit antenna elements 1130, each of which conveys a weighted combination of N=2 distinct substreams (i.e. spatially-multiplexed signals) and uses OFDM modulation.

The system 1100 may be characterized as a paired single-weight ("paired SW") system, since a pair of antenna elements 1130 in the transmitter 1110 and a pair of antenna elements 1134 in the receiver 1120 are each effectively connected to a single RF chain 1140, 1142. This approach affords the system 1100 the performance advantages associated with multi-antenna implementations while even further reducing cost and implementation complexity relative to the system represented in FIG. 8. Indeed, for the exemplary case in which four antenna elements 1130 are deployed at the transmitter 1110 and four antenna elements 1134 are likewise deployed at the receiver 1120 so as to support communication of two spatially-multiplexed signals, only two RF weight coefficients 1132 are required at the transmitter 1110 and only two RF weight coefficients 1150 are required at the receiver 1120 (i.e., a total of four weighting coefficients are utilized within the system 1100). In contrast, a similar four-antenna implementation in the system of FIG. 8 requires a total of six RF weight coefficients at each of the transmitter and receiver; (that is, in this case the system of FIG. 8 would utilize a total of twelve RF weight coefficients). It is noted that the foregoing assumes that at least one weight coefficient has been normalized to unity in each of the transmitters and receivers of the systems of FIGS. 8 and 11. The reduced number of RF weights required by the system 1100 directly translates into a less costly and simplified implementation.

In the configuration of FIG. 11, the transmit signal at tone k from the $j^{th}$ antenna 1130 is:

$$txs_{j,k} = \sum_{i=1}^{N} v_{j,i} \cdot s'_{i,k} \qquad (129.)$$

where $$s'_{i,k} = \sum_{l=1}^{N} v'_{i,l,k} \cdot s_{l,k} \qquad (130.)$$

and where the terms v and v' represent the RF and baseband weights, respectively. The transmit vector at tone k is $$\underline{txs}_k = V \cdot V_k' \cdot \underline{s}_k \qquad (131.)$$

where V is the transmit RF weight matrix of size $n_T \times N$ and is independent of the index k (as it is constant over the frequency tones), and where $V_k'$ is the transmit baseband weight matrix of size N×N and is dependent upon on the index k (as it is a function of frequency).

As a consequence of the dedication of a pair of antennas to a single RF chain within the paired SW system 1100, the structure of V is given as:

$$V = \begin{bmatrix} v_a & 0 \\ v_b & 0 \\ 0 & v_c \\ 0 & v_d \end{bmatrix} \qquad (132.)$$

such that the pair of antennas indexed by i sends a signal containing contributions only of $s'_{i,k}$. If the columns in V are normalized by their first coefficient, the structure of V becomes:

$$V = \begin{bmatrix} 1 & 0 \\ v_1 & 0 \\ 0 & 1 \\ 0 & v_2 \end{bmatrix} \qquad (133.)$$

In order to simplify the above example, it is considered that $V_k'$ is equal to the identity matrix at each tone. It is to be understood that in other embodiments, $V_k'$ can be a matrix other than the identity matrix. For example, when $V_k'$ is dependent upon the channel, various "precoding" methods and the like can assist in the computation of $V_k'$ given a specific criterion to optimize. To simplify further, consider that V is equal to:

$$V = \begin{bmatrix} 1 & 0 \\ 0 & 0 \\ 0 & 1 \\ 0 & 0 \end{bmatrix} \qquad (134.)$$

In other words, the transmitter 1110 has been simplified such that only two of four antennas 1130 are used and each such antenna 1130 transmits its own spatially-multiplexed signal, i.e., the transmit vector at tone k becomes $$\underline{txs}_k = \underline{s}_k \tag{135.}$$

where $\underline{txs}_k$ is a N×1 vector. It is to be understood that in other embodiments, V can be given by the general expression (133).

As mentioned above, the receiver 1120 of FIG. 11 also utilizes distinct RF and baseband weighting and combining arrangements. Specifically, a first set of weights 1150 for the RF-based arrangement 1122 are implemented at RF and are common to all tones, while a second set of weights 1154 are utilized within the baseband arrangement 1124. Note that the step of computing the RF weights 1150 may also be carried out in baseband, in which case the values of the weights 1150 are fed back to the RF domain via an internal bus, creating a feedback delay.

In this configuration, the output at the FFT 1158 at tone k for the $i^{th}$ receive chain is given by $$r_{i,k} = \underline{u}_i^H \underline{H}_k \cdot \underline{s}_k + \underline{u}_i^H \underline{n}_k \tag{136.}$$

where $\underline{u}_i$ is the RF weight vector associated with the $i^{th}$ pair of receive antennas 1134. The received signals are collected from each receive chain in an N-dimensional vector. At tone k, this received signal vector $\underline{r}_k$ becomes of dimension N×1 and may be expressed as:

$$\underline{r}_k = U^H (H_k \cdot \underline{s}_k + \underline{n}_k) = U^H H_k \cdot \underline{s}_k + U^H \underline{n}_k \tag{137.}$$

where $U = [\underline{u}_1, \ldots, \underline{u}_N]$ is an M×N matrix containing the set of weights implemented at RF with the specific structure:

$$U = \begin{bmatrix} u_a & 0 \\ u_b & 0 \\ 0 & u_c \\ 0 & u_d \end{bmatrix} \tag{138.}$$

After normalization, U becomes:

$$u = \begin{bmatrix} 1 & 0 \\ u_1 & 0 \\ 0 & 1 \\ 0 & u_2 \end{bmatrix} \tag{139.}$$

Expression (137) can also be written as:

$$\underline{r}_k = H_k^n \cdot \underline{s}_k + \underline{n}_k \tag{140.}$$

where $H_k^n = U^H H_k$ and $\underline{n}_k = U^H \underline{n}_k$. The received signal $r_{i,k}$ can be rewritten as $$r_{i,k} = u_i^H H_{i,k} \cdot s_{i,k} + u_i^H \left( \sum_{j \ne i}^N H_{j,k} \cdot s_{j,k} + n_k \right) \tag{141.}$$

where $\underline{u}_i$ is the $i^{th}$ column of the matrix U given by (139), and $\underline{H}_{i,k}$ is the $i^{th}$ column of the matrix $H_k$.

The received signal model defined by equation (141) is composed of N signal components and a noise component.

Since the transmitter 1110 broadcasts N spatially-multiplexed signals in parallel and each of these signals have to be detected individually by the receiver 1120, each receiver chain considers one spatially-multiplexed signal as the desired signal component while the remaining N−1 spatially-multiplexed signals are considered as interferers. Considering that the $i^{th}$ receive chain considers the $i^{th}$ spatially-multiplexed signal as the desired signal component, equation (141) is rewritten as:

$$r_{i,k} = \underline{u}_i^H \underline{H}_{i,k} \cdot s_{i,k} + \underline{u}_i^H \underline{\mu}_{i,k} \tag{142.}$$

where μ is considered as the noise plus interference signal.

In this embodiment, the RF weight vectors $\underline{u}_i$ are designed to maximize the SNR (while the baseband weights 1154 cancel the interference created by the multiple spatially-multiplexed signals). The SNR associated with the $k^{th}$ tone of the $i^{th}$ receive chain is expressed as $$SNR_{i,k} = \sigma_s^2 \frac{u_i^H H_{i,k} H_{i,k}^H u_i}{\sigma^2 u_i^H u_i} \tag{143.}$$

The aggregate SNR across all k tones of the $i^{th}$ receive chain is then $$\overline{SNR}_i = \sum_{k=0}^{N_t-1} SNR_{i,k} = \sigma_s^2 \frac{u_i^H \left( \sum_{k=0}^{N_t-1} H_{i,k} H_{i,k}^H \right) u_i}{\sigma^2 u_i^H u_i} \tag{144.}$$

The solution for $\underline{u}_i$ which maximizes $\overline{SNR}_i$ is given by the eigenvector of the matrix $$\left( \sum_{k=0}^{N_t-1} H_{i,k} H_{i,k}^H \right)$$

corresponding to the largest eigenvalue, and may be formulated as:

$$\underline{u}_i = eig\left( \lambda_{max}, \sum_{k=0}^{N_t-1} H_{i,k} H_{i,k}^H \right), i = 1, \ldots, N \tag{145.}$$

The received vector is then multiplied at each tone k by the complex conjugate of an N×N matrix denoted by $W_k$ so as to enable detection of the transmitted signals. The resulting output signal at tone k is given by:

$$\underline{y}_k = W_k^H \cdot \underline{r}_k = W_k^H H_k^n \cdot \underline{s}_k + W_k^H \underline{n}_k = W_k^H U^H (H_k \cdot \underline{s}_k + \underline{n}_k) \tag{146.}$$

It is observed that while the weights $W_k$ are a function of the applicable frequency tone k, the RF weights U are common to all tones.

Equation (146) may be solved for $W_k$ using, for example, the well-known minimum mean squared error (MMSE) solution (i.e., the Wiener-Hopf solution). See, e.g., S. Haykin, Adaptive Filter Theory, 3$^{rd}$ Ed., Prentice Hall, 1996. The general solution is given by $$W_k = (H_k'' R_{s,k} H_k''^H + R_{\eta,k})^{-1} H_k'' R_{s,k} \quad (147.)$$

We have $R_{s,k} = \sigma_s^2 I_N$ and $R_{\eta,k} = E[\eta_k \eta_k^H] = \sigma^2 U^H U$, thus $$W_k = \left(H_k'' H_k''^H + \frac{\sigma^2}{\sigma_s^2} U^H U\right)^{-1} H_k'' \quad (148.)$$

$W_k$ is derived directly from the knowledge of matrices $H_k$ and U, where U is given by equations (145).

It should be apparent from the above description that the paired SW system of FIG. 11 comprises a special case of the communication system described with reference to FIG. 8. In particular, the weight coefficients for the paired SW system may be computed in accordance with the same principles used to derive the coefficient values utilized within the system of FIG. 8, subject to the constraint that certain of the RF weight coefficients are set to zero. Although implementations of the paired SW concept have been presented for the specific case of four antennas and two spatially-multiplexed signals, the inventive concept is equally applicable to systems of larger size which are capable of processing greater numbers of spatially-multiplexed signals. Moreover, the inventive paired SW concept is similarly applicable to single-channel systems.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. In a receiver having a plurality of receive antennas disposed to produce a corresponding plurality of received RF signals, each of said plurality of received RF signals being generated in response to a transmitted RF signal received through a channel, a signal weighting and combining method comprising:
   weighting said plurality of received RF signals in accordance with a corresponding plurality of RF weighting values selected to maximize an output signal-to-noise ratio of said receiver averaged over said channel, thereby forming a plurality of weighted RF signals, wherein each of said plurality of RF weighting values is a frequency-independent weight coefficient that is constant over said channel; and
   combining at least a portion of said plurality of weighted RF signals in order to form one or more combined RF signals.

2. The method of claim 1, wherein said output signal-to-noise ratio is averaged in the time domain over a time response of said channel.

3. The method of claim 1, wherein said output signal-to-noise ratio is averaged in the frequency domain over a channel bandwidth of said channel.

4. The method of claim 3, wherein said channel bandwidth is equivalent to a bandwidth of said transmitted RF signal.

5. The method of claim 1, comprising calculating said plurality of RF weighting values using the eigenvector corresponding to the largest eigenvalue of a channel cross-correlation matrix averaged over said channel.

6. The method of claim 5, wherein said channel cross-correlation matrix is averaged over said channel in the frequency domain.

7. The method of claim 5, wherein said channel cross-correlation matrix is averaged over a channel delay profile of said channel.

8. The method of claim 1, comprising:
   downconverting said one or more combined RF signals in order to form one or more baseband signals; and
   performing a baseband weighting and combining operation upon said one or more baseband signals utilizing a set of baseband weighting values.

9. The method of claim 8, wherein said set of baseband weighting values is computed jointly with said plurality of RF weighting values.

10. In a multi-antenna transmitter disposed to transmit an RF input signal through a plurality of transmit antennas so as to produce a corresponding plurality of RF output signals, each of said RF output signals being received by a receiver after propagating through a channel, an RF splitting and weighting method comprising:
    dividing said RF input signal in order to form a plurality of divided RF signals; and
    weighting said plurality of divided RF signals in accordance with a corresponding plurality of RF weighting values selected to maximize an output signal-to-noise ratio of said receiver averaged over said channel, thereby forming said plurality of RF output signals, wherein each of said plurality of RF weighting values is a frequency-independent weight coefficient that is constant over said channel.

11. The method of claim 10, wherein said output signal-to-noise ratio is averaged in the time domain over a time response of said channel.

12. The method of claim 10, wherein said output signal-to-noise ratio is averaged in the frequency domain over a channel bandwidth of said channel.

13. The method of claim 12, wherein said channel bandwidth is equivalent to a bandwidth of said RF output signals.

14. The method of claim 10, comprising calculating said plurality of RF weighting values using the eigenvector corresponding to the largest eigenvalue of a channel cross-correlation matrix averaged over said channel.

15. The method of claim 14, wherein said channel cross-correlation matrix is averaged over said channel in the frequency domain.

16. The method of claim 14, wherein said channel cross-correlation matrix is averaged over a channel delay profile of said channel.

17. The method of claim 10, wherein said transmitted RF signal comprises one or more of: a code division multiple access signal, a single carrier signal, an orthogonal frequency division multiplexed signal, and/or a UWB signal.

18. The method of claim 10, wherein said set of RF output signals comprises one or more of: a code division multiple access signal, a single carrier signal, an orthogonal frequency division multiplexed signal, and/or a UWB signal.

19. The method of claim 10, comprising performing a splitting and weighting operation upon an input baseband signal utilizing a set of baseband weighting values in order to form a first plurality of baseband signals wherein said RF input signal is generated based upon one or more of said first plurality of baseband signals.

20. In a communication system comprising a transmitter having a set of transmit antennas disposed to transmit a set of spatially-multiplexed RF output signals through a channel, and a receiver having a plurality of receive antennas disposed to generate a corresponding first plurality of spatially-multiplexed received RF signals in response to receipt of said spatially-multiplexed RF output signals, an RF processing method comprising:
generating said set of spatially-multiplexed RF output signals by performing a splitting and weighting operation upon a plurality of RF input signals, said splitting and weighting operation utilizing a first set of RF weighting values selected in accordance with one or more output signal-to-noise ratios of said receiver averaged over said channel, wherein each of said first set of RF weighting values is a frequency-independent weight coefficient that is constant over said channel; and
forming a second plurality of spatially-multiplexed received RF signals by performing a weighting and combining operation upon said first plurality of spatially-multiplexed received RF signals, said weighting and combining operation utilizing a second set of RF weighting values selected in accordance with said one or more output signal-to-noise ratios.

21. The method of claim 20, wherein said one or more output signal-to-noise ratios are averaged in the time domain over a time response of said channel.

22. The method of claim 20, wherein said one or more output signal-to-noise ratios are averaged in the frequency domain over a channel bandwidth of said channel.

23. The method of claim 20, comprising calculating said first set of RF weighting values using the eigenvector corresponding to the largest eigenvalue of a channel cross-correlation matrix averaged over said channel.

24. The method of claim 20, comprising calculating said second set of RF weighting values using the eigenvector corresponding to the largest eigenvalue of a channel cross-correlation matrix averaged over said channel.

25. The method of claim 24, wherein said channel cross-correlation matrix is averaged over said channel in the frequency domain.

26. The method of claim 24, wherein said channel cross-correlation matrix is averaged over a channel delay profile of said channel.

27. The method of claim 20, comprising performing a splitting and weighting operation upon plural baseband input signals utilizing a first set of baseband weighting values in order to form a first set of baseband signals wherein said plural RF input signals are generated based upon one or more of said first set of baseband signals.

28. The method of claim 20, comprising:
downconverting said second plurality of spatially-multiplexed received RF signals in order to form a first set of baseband signals; and
performing a baseband weighting and combining operation upon said first set of baseband signals utilizing a first set of baseband weighting values.

29. In a receiver having a plurality of receive antennas disposed to produce a corresponding plurality of spatially-multiplexed received RF signals in response to receipt through a channel of spatially-multiplexed transmitted RF signal energy, a signal weighting and combining method comprising:
weighting each of said plurality of spatially-multiplexed received RF signals utilizing a corresponding set of RF weighting values selected in accordance with one or more output signal-to-noise ratios of said receiver averaged over said channel, thereby forming plural spatially-multiplexed weighted RF signals, wherein each of said RF weighting values is a frequency-independent weight coefficient that is constant over said channel; and
combining at least a portion of said plural spatially-multiplexed weighted RF signals in order to form one or more spatially-multiplexed combined RF signals.

30. The method of claim 29, wherein said one or more output signal-to-noise ratios are averaged in the time domain over a time response of said channel.

31. The method of claim 29, wherein said one or more output signal-to-noise ratios are averaged in the frequency domain over a channel bandwidth of said channel.

32. The method of claim 31, wherein said channel bandwidth is equivalent to a bandwidth of said spatially-multiplexed transmitted RF signal energy.

33. The method of claim 29, comprising calculating said RF weighting values using the eigenvector corresponding to the largest eigenvalue of a channel cross-correlation matrix averaged over said channel.

34. The method of claim 33, wherein said channel cross-correlation matrix is averaged over said channel in the frequency domain.

35. The method of claim 33, wherein said channel cross-correlation matrix is averaged over a channel delay profile of said channel.

36. In a multi-antenna transmitter disposed to transmit a spatially-multiplexed RF input signal through a plurality of transmit antennas so as to produce a corresponding plurality of spatially-multiplexed RF output signals, each of said spatially-multiplexed RF output signals being received by a receiver after propagating through a channel, an RF splitting and weighting method comprising:
dividing said spatially-multiplexed RF input signal in order to form a plurality of spatially-multiplexed divided RF signals;
weighting said plurality of spatially-multiplexed divided RF signals utilizing a set of RF weighting values selected in accordance with one or more output signal-to-noise ratios of said receiver averaged over said channel in order to form plural spatially-multiplexed weighted RF signals, wherein each of said RF weighting values is a frequency-independent weight coefficient that is constant over said channel; and
combining at least a portion of said plural spatially-multiplexed weighted RF signals, thereby forming said plurality of spatially-multiplexed RF output signals.

37. The method of claim 36, wherein said one or more output signal-to-noise ratios are averaged in the time domain over a time response of said channel.

38. The method of claim 36, wherein said one or more output signal-to-noise ratios are averaged in the frequency domain over a channel bandwidth of said channel.

39. The method of claim 38, wherein said channel bandwidth is equivalent to a bandwidth of said spatially-multiplexed RF output signals.

40. The method of claim 36, comprising calculating said set of RF weighting values using the eigenvector corresponding to the largest eigenvalue of a channel cross-correlation matrix averaged over said channel.

41. The method of claim 40, wherein said channel cross-correlation matrix is averaged over said channel in the frequency domain.

42. The method of claim 40, wherein said channel cross-correlation matrix is averaged over a channel delay profile of said channel.

43. In a communication system including a transmitter having a set of transmit antennas disposed to transmit a set of RF output signals through a channel, and a receiver having a plurality of receive antennas disposed to generate a corresponding plurality of received RF signals in response to receipt of said RF output signals, an RF processing method comprising:
  generating said set of RF output signals by performing a splitting and weighting operation upon an RF input signal, said splitting and weighting operation utilizing a first set of RF weighting values selected to maximize an output signal-to-noise ratio of said receiver averaged over said channel, wherein each of said first set of RF weighting values is a frequency-independent weight coefficient that is constant over said channel; and
  generating one or more received combined RF signals by performing a weighting and combining operation upon said plurality of received RF signals using a second set of RF weighting values, said second set of RF weighting values being selected to maximize said output signal-to-noise ratio.

44. The method of claim 43, wherein said output signal-to-noise ratio is averaged in the time domain over a time response of said channel.

45. The method of claim 43, wherein said output signal-to-noise ratio is averaged in the frequency domain over a channel bandwidth of said channel.

46. The method of claim 43, comprising calculating said first set of RF weighting values using the eigenvector corresponding to the largest eigenvalue of a channel cross-correlation matrix averaged over said channel.

47. The method of claim 43, comprising calculating said second set of RF weighting values using the eigenvector corresponding to the largest eigenvalue of a channel cross-correlation matrix averaged over said channel.

48. The method of claim 47, wherein said channel cross-correlation matrix is averaged over said channel in the frequency domain.

49. The method of claim 47, wherein said channel cross-correlation matrix is averaged over a channel delay profile of said channel.

50. The method of claim 43, comprising performing a splitting and weighting operation upon an input baseband signal utilizing a first set of baseband weighting values in order to form a first set of baseband signals, wherein said RF input signal is generated based upon one or more of said first set of baseband signals.

51. The method of claim 43, comprising:
  downconverting said one or more received combined RF signals in order to form a first set of baseband signals; and
  performing a baseband weighting and combining operation upon said first set of baseband signals utilizing a first set of baseband weighting values.

52. The method of claim 43, wherein said first set of RF weighting values and said second set of RF weighting values are computed jointly.

53. The method of claim 51, wherein said first and second set of RF weighting values and said first set of baseband weighting values are computed jointly.

54. The method of claim 50, wherein said first and second set of RF weighting values and said first set of baseband weighting values are computed jointly.

55. In a receiver having at least first and second receive antennas disposed to produce at least first and second received RF signals in response to a transmitted RF signal received through a channel, a signal weighting and combining method comprising:
  weighting said at least first and second received RF signals respectively in accordance with first and second RF weighting values selected to maximize an output signal-to-noise ratio of said receiver averaged over said channel, thereby forming first and second paired single-weight RF signals, wherein each of said RF weighting values is a frequency-independent weight coefficient that is constant over said channel; and
  combining said first and second paired single-weight RF signals in order to form one or more combined RF signals.

56. The method of claim 55, wherein one of said first and second RF weighting values is normalized to unity.

57. The method of claim 55, comprising calculating said first and second RF weighting values using the eigenvector corresponding to the largest eigenvalue of a channel cross-correlation matrix averaged over said channel.

58. The method of claim 57, wherein said channel cross-correlation matrix is averaged over said channel in the frequency domain.

59. The method of claim 57, wherein said channel cross-correlation matrix is averaged over a channel delay profile of said channel.

60. In a multi-antenna transmitter disposed to transmit an RF input signal through first and second transmit antennas so as to produce first and second RF output signals, said first and second RF output signals being received by a receiver after propagating through a channel, an RF splitting and weighting method comprising:
  dividing said RF input signal in order to form first and second divided RF signals; and
  weighting said first and second divided RF signals respectively in accordance with first and second RF weighting values selected to maximize an output signal-to-noise ratio of said receiver averaged over said channel, thereby forming said first and second RF output signals, wherein each of said RF weighting values is a frequency-independent weight coefficient that is constant over said channel.

61. The method of claim 60, wherein one of said first and second RF weighting values is normalized to unity.

62. The method of claim 60, comprising calculating said first and second RF weighting values using the eigenvector corresponding to the largest eigenvalue of a channel cross-correlation matrix averaged over said channel.

63. The method of claim 62, wherein said channel cross-correlation matrix is averaged over said channel in the frequency domain.

64. The method of claim 62, wherein said channel cross-correlation matrix is averaged over a channel delay profile of said channel.

65. In a receiver having a plurality of receive antennas disposed to produce a corresponding plurality of spatially-multiplexed received RF signals in response to receipt through a channel of spatially-multiplexed transmitted RF signal energy, a signal weighting and combining method comprising:

- weighting first and second of said plurality of spatially-multiplexed received RF signals respectively in accordance with first and second RF weighting values selected in accordance with one or more output signal-to-noise ratios of said receiver averaged over said channel, thereby forming first and second paired single-weight RF signals;
- weighting third and fourth of said plurality of spatially-multiplexed received RF signals respectively in accordance with third and fourth RF weighting values selected in accordance with said one or more output signal-to-noise ratios of said receiver averaged over said channel, thereby forming third and fourth paired single-weight RF signals;
- combining said first and second paired single-weight RF signals in order to form a first combined signal and combining said third and fourth paired single-weight RF signals in order to form a second combined signal; and
- processing said first combined signal using a first RF chain and processing said second combined signal using a second RF chain, wherein each of said RF weighting values is a frequency-independent weight coefficient that is constant over said channel.

66. The method of claim 65, wherein one of said first and second RF weighting values is normalized to unity.

67. The method of claim 66, wherein one of said third and fourth RF weighting values is normalized to unity.

68. The method of claim 65, comprising calculating said RF weighting values using the eigenvector corresponding to the largest eigenvalue of a channel cross-correlation matrix averaged over said channel.

69. The method of claim 66, wherein said channel cross-correlation matrix is averaged over said channel in the frequency domain.

70. The method of claim 66, wherein said channel cross-correlation matrix is averaged over a channel delay profile of said channel.

71. In a multi-antenna transmitter disposed to transmit a spatially-multiplexed RF input signal through a plurality of transmit antennas so as to produce a corresponding plurality of spatially-multiplexed RF output signals, each of said spatially-multiplexed RF output signals being received by a receiver after propagating through a channel, an RF splitting and weighting method comprising:

- dividing said spatially-multiplexed RF input signal in order to form a plurality of spatially-multiplexed divided RF signals;
- weighting first and second of said plurality of spatially-multiplexed divided RF signals using respective first and second RF weighting values in order to form first and second paired single-weight RF signals in communication with first and second of said plurality of transmit antennas, said first and second RF weighting values being selected in accordance with one or more output signal-to-noise ratios of said receiver averaged over said channel; and
- weighting third and fourth of said plurality of spatially-multiplexed divided RF signals using respective third and fourth RF weighting values in order to form third and fourth paired single-weight RF signals in communication with third and fourth of said plurality of transmit antennas, said third and fourth RF weighting values being selected in accordance with said one or more output signal-to-noise ratios of said receiver, wherein each of said RF weighting values is a frequency-independent weight coefficient that is constant over said channel.

72. The method of claim 71, wherein one of said first and second RF weighting values is normalized to unity.

73. The method of claim 72, wherein one of said third and fourth RF weighting values is normalized to unity.

74. The method of claim 71, comprising calculating said set of RF weighting values using the eigenvector corresponding to the largest eigenvalue of a channel cross-correlation matrix averaged over said channel.

75. The method of claim 74, wherein said channel cross-correlation matrix is averaged over said channel in the frequency domain.

76. The method of claim 74, wherein said channel cross-correlation matrix is averaged over a channel delay profile of said channel.

* * * * *